(12) United States Patent
Hasek

(10) Patent No.: US 8,938,763 B2
(45) Date of Patent: *Jan. 20, 2015

(54) PERSONAL CONTENT SERVER APPARATUS AND METHODS

(75) Inventor: Charles A. Hasek, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/471,200

(22) Filed: May 14, 2012

(65) Prior Publication Data

US 2012/0291104 A1    Nov. 15, 2012

Related U.S. Application Data

(62) Division of application No. 11/712,800, filed on Feb. 28, 2007, now Pat. No. 8,181,206.

(51) Int. Cl.
*G06F 3/00* (2006.01)
*G06F 13/00* (2006.01)
(Continued)

(52) U.S. Cl.
CPC ....... *H04N 7/17318* (2013.01); *H04N 21/2221* (2013.01); *H04N 21/4332* (2013.01); *H04N 21/472* (2013.01); *H04N 21/4331* (2013.01);
(Continued)

(58) Field of Classification Search
USPC .................... 725/58, 86–87, 114–117; 726/4; 709/217, 219
See application file for complete search history.

(56) References Cited

U.S. PATENT DOCUMENTS

| 3,388,376 A | 6/1968 | Magee |
| 4,355,415 A | 10/1982 | George et al. |

(Continued)

FOREIGN PATENT DOCUMENTS

| EP | 1134951 A2 | 9/2001 |
| JP | 52018653 | 2/1977 |

(Continued)

OTHER PUBLICATIONS

DK. Kahaner (Mar. 16, 1991) "Hitachi 1991 Technology Exhibition, Tokyo," Asian Technology Information Program, pp. 1-14.

(Continued)

*Primary Examiner* — Mulugeta Mengesha
(74) *Attorney, Agent, or Firm* — Gazdzinski & Associates, PC

(57) ABSTRACT

Personal content server apparatus and associated methods that allow a user (e.g., cable or satellite network subscriber) to access content, such as a video program, from a location outside the subscriber's network. In one embodiment, a personal content server streams the content to the subscriber over a network connection from the local e.g., (subscription) network to a remote network upon authorization by a content manager process. Various access, business or operational rules are applied depending on the content and delivery mode; e.g., to live video broadcast, video-on-demand (VOD), or archived content from the subscriber's digital video recorder (DVR) or networked PVR. In another variant, reservation information (for example program or asset ID information) is cached at a headend or hub server, thereby obviating the subscriber (or the network) having to access the subscriber's premises device. In yet another variant, a "virtual" CPE experience is provided for the remote user.

25 Claims, 17 Drawing Sheets

(51) Int. Cl.

| | | |
|---|---|---|
| *H04N 5/445* | (2011.01) | |
| *H04N 21/222* | (2011.01) | |
| *H04N 21/433* | (2011.01) | |
| *H04N 7/173* | (2011.01) | |
| *H04N 21/472* | (2011.01) | |
| *H04N 21/2225* | (2011.01) | |
| *H04N 21/63* | (2011.01) | |
| *H04N 21/4788* | (2011.01) | |

(52) U.S. Cl.
CPC ......... *H04N 21/2225* (2013.01); *H04N 21/632* (2013.01); *H04N 21/4788* (2013.01)
USPC ................ 725/58; 725/86; 725/87; 725/114; 725/115; 725/116; 725/117

(56) References Cited

U.S. PATENT DOCUMENTS

| | | |
|---|---|---|
| 4,534,056 A | 8/1985 | Feilchenfeld et al. |
| 4,577,177 A | 3/1986 | Marubashi |
| 4,694,490 A | 9/1987 | Harvey et al. |
| 4,708,224 A | 11/1987 | Schrooder |
| 4,749,062 A | 6/1988 | Tsuji et al. |
| 4,908,707 A | 3/1990 | Kinghorn |
| 4,930,158 A | 5/1990 | Vogel |
| 4,959,720 A | 9/1990 | Duffield et al. |
| 4,975,909 A | 12/1990 | Masson et al. |
| 4,977,455 A | 12/1990 | Young |
| 4,979,593 A | 12/1990 | Watanabe et al. |
| 4,995,479 A | 2/1991 | Fujiwara et al. |
| 5,042,620 A | 8/1991 | Yoneda et al. |
| 5,047,867 A | 9/1991 | Strubbe et al. |
| 5,056,629 A | 10/1991 | Tsuji et al. |
| 5,086,450 A | 2/1992 | Kitagawa et al. |
| 5,159,163 A | 10/1992 | Bahjat et al. |
| 5,172,413 A | 12/1992 | Bradley et al. |
| 5,200,583 A | 4/1993 | Kupersmith et al. |
| 5,200,822 A | 4/1993 | Bronfin et al. |
| 5,253,066 A | 10/1993 | Vogel |
| 5,255,341 A | 10/1993 | Nakajima |
| 5,285,272 A | 2/1994 | Bradley et al. |
| 5,287,266 A | 2/1994 | Malec et al. |
| 5,295,064 A | 3/1994 | Malec et al. |
| 5,335,277 A | 8/1994 | Harvey et al. |
| 5,357,276 A | 10/1994 | Banker et al. |
| 5,371,532 A | 12/1994 | Gelman et al. |
| 5,371,551 A | 12/1994 | Logan et al. |
| 5,394,182 A | 2/1995 | Klappert et al. |
| 5,412,720 A | 5/1995 | Hoarty |
| 5,414,455 A | 5/1995 | Hooper et al. |
| 5,442,389 A | 8/1995 | Blahut et al. |
| 5,461,415 A | 10/1995 | Wolf et al. |
| 5,463,209 A | 10/1995 | Figh et al. |
| 5,479,266 A | 12/1995 | Young et al. |
| 5,479,268 A | 12/1995 | Young et al. |
| 5,485,897 A | 1/1996 | Matsumoto et al. |
| 5,512,934 A | 4/1996 | Kochanski |
| 5,517,257 A | 5/1996 | Dunn et al. |
| 5,524,195 A | 6/1996 | Clanton, III et al. |
| 5,528,282 A | 6/1996 | Voeten et al. |
| 5,534,911 A | 7/1996 | Levitan |
| 5,551,532 A | 9/1996 | Kupersmith |
| 5,583,561 A | 12/1996 | Baker et al. |
| 5,583,563 A | 12/1996 | Wanderscheid et al. |
| 5,585,838 A | 12/1996 | Lawler et al. |
| 5,589,892 A | 12/1996 | Knee et al. |
| 5,592,551 A | 1/1997 | Lett et al. |
| 5,606,154 A | 2/1997 | Doigan et al. |
| 5,619,247 A | 4/1997 | Russo |
| 5,619,249 A | 4/1997 | Billock et al. |
| 5,652,615 A | 7/1997 | Bryant et al. |
| 5,657,072 A | 8/1997 | Aristides et al. |
| 5,659,350 A | 8/1997 | Hendricks et al. |
| 5,671,225 A | 9/1997 | Hooper et al. |
| 5,675,647 A | 10/1997 | Garneau et al. |
| 5,682,597 A | 10/1997 | Ganek et al. |
| 5,684,714 A | 11/1997 | Yogeshwar et al. |
| 5,684,963 A | 11/1997 | Clement |
| 5,689,094 A | 11/1997 | Friedli et al. |
| 5,701,383 A | 12/1997 | Russo et al. |
| 5,710,970 A | 1/1998 | Walters et al. |
| 5,721,878 A | 2/1998 | Ottesen et al. |
| 5,724,646 A | 3/1998 | Ganek et al. |
| 5,729,280 A | 3/1998 | Inoue et al. |
| 5,729,648 A | 3/1998 | Boyce et al. |
| 5,748,254 A | 5/1998 | Harrison et al. |
| 5,749,443 A | 5/1998 | Romao |
| 5,751,282 A | 5/1998 | Girard et al. |
| 5,761,607 A | 6/1998 | Gudesen |
| 5,771,354 A | 6/1998 | Crawford |
| 5,771,435 A | 6/1998 | Brown |
| 5,778,181 A | 7/1998 | Hidary et al. |
| 5,778,187 A | 7/1998 | Monteiro et al. |
| 5,781,228 A | 7/1998 | Sposato |
| 5,793,971 A | 8/1998 | Fujita et al. |
| 5,794,217 A | 8/1998 | Allen |
| 5,805,154 A | 9/1998 | Brown |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,815,148 A | 9/1998 | Tanaka |
| 5,818,440 A | 10/1998 | Allibhoy et al. |
| 5,818,510 A | 10/1998 | Cobbley et al. |
| 5,819,034 A | 10/1998 | Joseph et al. |
| 5,822,530 A | 10/1998 | Brown |
| 5,826,168 A | 10/1998 | Inoue et al. |
| 5,832,231 A | 11/1998 | Raman et al. |
| 5,844,181 A | 12/1998 | Amo et al. |
| 5,847,703 A | 12/1998 | Teicher et al. |
| 5,850,218 A | 12/1998 | LaJoie et al. |
| 5,861,881 A | 1/1999 | Freeman et al. |
| 5,887,139 A | 3/1999 | Madison et al. |
| 5,887,243 A | 3/1999 | Harvey et al. |
| 5,896,454 A | 4/1999 | Cookson et al. |
| 5,909,638 A | 6/1999 | Allen |
| 5,917,538 A | 6/1999 | Asamizuya |
| 5,918,222 A | 6/1999 | Fukui et al. |
| 5,930,473 A | 7/1999 | Teng et al. |
| 5,932,853 A | 8/1999 | Friedli et al. |
| 5,955,710 A | 9/1999 | DiFranza |
| 5,960,411 A | 9/1999 | Hartman et al. |
| 5,970,206 A | 10/1999 | Yuen et al. |
| 5,979,757 A | 11/1999 | Tracy et al. |
| 5,984,051 A | 11/1999 | Morgan et al. |
| 5,995,708 A | 11/1999 | Corey |
| 6,005,603 A | 12/1999 | Flavin |
| 6,005,643 A | 12/1999 | Morimoto et al. |
| 6,011,839 A | 1/2000 | Friedli et al. |
| 6,016,509 A | 1/2000 | Dedrick |
| 6,052,145 A | 4/2000 | Macrae et al. |
| 6,057,832 A | 5/2000 | Lev et al. |
| 6,058,380 A | 5/2000 | Anderson et al. |
| 6,073,160 A | 6/2000 | Grantham et al. |
| 6,073,727 A | 6/2000 | DiFranza et al. |
| 6,078,928 A | 6/2000 | Schnase et al. |
| 6,082,500 A | 7/2000 | Amo et al. |
| 6,091,883 A | 7/2000 | Artigalas et al. |
| 6,097,431 A | 8/2000 | Anderson et al. |
| 6,112,192 A | 8/2000 | Capek |
| 6,160,989 A | 12/2000 | Hendricks et al. |
| 6,167,188 A | 12/2000 | Young et al. |
| 6,169,570 B1 | 1/2001 | Suzuki |
| 6,177,931 B1 | 1/2001 | Alexander et al. |
| 6,202,008 B1 | 3/2001 | Beckert et al. |
| 6,202,799 B1 | 3/2001 | Drop |
| 6,206,142 B1 | 3/2001 | Meacham |
| 6,208,335 B1 | 3/2001 | Gordon et al. |
| 6,223,160 B1 | 4/2001 | Kostka et al. |
| 6,233,389 B1 | 5/2001 | Barton et al. |
| 6,236,968 B1 | 5/2001 | Kanevsky et al. |
| 6,240,401 B1 | 5/2001 | Oren et al. |
| 6,321,257 B1 | 11/2001 | Kotola et al. |

(56) References Cited

U.S. PATENT DOCUMENTS

| | | | |
|---|---|---|---|
| 6,324,338 B1 | 11/2001 | Wood et al. | |
| 6,327,418 B1 | 12/2001 | Barton | |
| 6,341,668 B1 | 1/2002 | Fayette et al. | |
| 6,343,313 B1 | 1/2002 | Salesky et al. | |
| 6,349,797 B1 | 2/2002 | Newville et al. | |
| 6,378,035 B1 | 4/2002 | Parry et al. | |
| 6,378,129 B1 | 4/2002 | Zetts | |
| 6,397,976 B1 | 6/2002 | Hale et al. | |
| 6,421,305 B1 | 7/2002 | Gioscia et al. | |
| 6,434,562 B1 | 8/2002 | Pennywitt et al. | |
| RE37,881 E | 10/2002 | Haines | |
| 6,460,036 B1 | 10/2002 | Herz | |
| 6,466,232 B1 | 10/2002 | Newell et al. | |
| 6,504,571 B1 | 1/2003 | Narayanaswami et al. | |
| 6,571,279 B1 | 5/2003 | Herz et al. | |
| 6,574,617 B1 | 6/2003 | Immerman et al. | |
| 6,587,835 B1 | 7/2003 | Treyz et al. | |
| 6,598,228 B2 | 7/2003 | Hejna, Jr. | |
| 6,611,654 B1 | 8/2003 | Shteyn | |
| 6,615,175 B1 | 9/2003 | Gazdzinski | |
| 6,651,045 B1 | 11/2003 | Macaulay | |
| 6,741,980 B2 | 5/2004 | Langseth et al. | |
| 6,757,796 B1 | 6/2004 | Hofmann | |
| 6,760,918 B2 | 7/2004 | Rodriguez et al. | |
| 6,769,127 B1 | 7/2004 | Bonomi et al. | |
| 6,782,550 B1 | 8/2004 | Cao | |
| 6,801,792 B1 | 10/2004 | Schuster et al. | |
| 6,959,288 B1 | 10/2005 | Meding | |
| 6,978,370 B1 | 12/2005 | Kocher | |
| 6,990,312 B1 | 1/2006 | Gioscia et al. | |
| 7,020,892 B2 | 3/2006 | Levesque et al. | |
| 7,024,678 B2 | 4/2006 | Gordon et al. | |
| 7,025,209 B2 | 4/2006 | Hawkins | |
| 7,028,009 B2 | 4/2006 | Wang | |
| 7,028,329 B1 | 4/2006 | Mizutani | |
| 7,054,843 B2 | 5/2006 | Chara | |
| 7,058,685 B1 | 6/2006 | Van Zee et al. | |
| 7,058,810 B2 | 6/2006 | Kumazawa et al. | |
| 7,073,189 B2 | 7/2006 | McElhatten et al. | |
| 7,080,400 B1 | 7/2006 | Navar | |
| 7,103,906 B1 | 9/2006 | Katz et al. | |
| 7,136,573 B2 | 11/2006 | Kikuchi et al. | |
| 7,136,853 B1 | 11/2006 | Kohda et al. | |
| 7,159,235 B2 | 1/2007 | Son et al. | |
| 7,184,526 B1 | 2/2007 | Cook | |
| 7,191,244 B2 | 3/2007 | Jennings et al. | |
| 7,203,185 B1 | 4/2007 | Dhara et al. | |
| 7,203,311 B1 | 4/2007 | Kahn | |
| 7,209,892 B1 | 4/2007 | Galuten | |
| 7,212,543 B1 | 5/2007 | Arwald | |
| 7,213,742 B1 | 5/2007 | Birch | |
| 7,257,308 B2 | 8/2007 | Plourde | |
| 7,263,188 B2 | 8/2007 | Kohno | |
| 7,266,832 B2 | 9/2007 | Miller | |
| 7,305,357 B2 | 12/2007 | Hamilton | |
| 7,305,691 B2 | 12/2007 | Cristofalo | |
| 7,315,886 B1 | 1/2008 | Meenan et al. | |
| 7,320,134 B1 | 1/2008 | Tomsen | |
| 7,337,459 B1 | 2/2008 | Tsutsui | |
| 7,340,760 B2 | 3/2008 | Wachtfogel | |
| 7,346,558 B2 | 3/2008 | Rosenberg | |
| 7,360,233 B2 | 4/2008 | Russ et al. | |
| 7,383,228 B2 | 6/2008 | Lisanke et al. | |
| 7,567,988 B2 | 7/2009 | Wolf et al. | |
| 7,627,492 B2 | 12/2009 | Nishizawa et al. | |
| 8,028,322 B2 | 9/2011 | Riedl et al. | |
| 8,583,758 B2 | 11/2013 | Casey et al. | |
| 2001/0003194 A1 | 6/2001 | Shimura | |
| 2001/0030975 A1 | 10/2001 | Limb et al. | |
| 2002/0019984 A1 | 2/2002 | Rakib | |
| 2002/0049800 A1 | 4/2002 | Kobayashi et al. | |
| 2002/0059619 A1 | 5/2002 | Lebar | |
| 2002/0085516 A1 | 7/2002 | Bridgelall | |
| 2002/0104019 A1 | 8/2002 | Chatani et al. | |
| 2002/0143565 A1 | 10/2002 | Headings et al. | |
| 2002/0152458 A1 | 10/2002 | Eyer et al. | |
| 2002/0169961 A1 | 11/2002 | Giles et al. | |
| 2002/0188689 A1 | 12/2002 | Michael | |
| 2002/0194498 A1 | 12/2002 | Blight et al. | |
| 2002/0196940 A1 | 12/2002 | Isaacson et al. | |
| 2003/0005447 A1 | 1/2003 | Rodriguez | |
| 2003/0022990 A1 | 1/2003 | Reisman | |
| 2003/0023690 A1 | 1/2003 | Lohtia | |
| 2003/0028893 A1 | 2/2003 | Addington | |
| 2003/0037335 A1 | 2/2003 | Gatto et al. | |
| 2003/0037338 A1 | 2/2003 | Suzuki | |
| 2003/0049021 A1 | 3/2003 | Kamieniecki | |
| 2003/0056217 A1 | 3/2003 | Brooks | |
| 2003/0070052 A1 | 4/2003 | Lai | |
| 2003/0149884 A1 | 8/2003 | Hernandez et al. | |
| 2003/0149988 A1 | 8/2003 | Ellis et al. | |
| 2003/0208763 A1 | 11/2003 | McElhatten et al. | |
| 2003/0208767 A1 | 11/2003 | Williamson | |
| 2003/0217365 A1 | 11/2003 | Caputo | |
| 2003/0226150 A1 | 12/2003 | Berberet | |
| 2003/0229898 A1 | 12/2003 | Babu et al. | |
| 2003/0229900 A1 | 12/2003 | Reisman | |
| 2003/0236839 A1 | 12/2003 | Demsky et al. | |
| 2004/0015608 A1 | 1/2004 | Ellis et al. | |
| 2004/0015989 A1 | 1/2004 | Kaizu et al. | |
| 2004/0104842 A1 | 6/2004 | Drury et al. | |
| 2004/0117846 A1 | 6/2004 | Karaoguz et al. | |
| 2004/0153525 A1 | 8/2004 | Borella | |
| 2004/0172531 A1 | 9/2004 | Little et al. | |
| 2004/0221305 A1 | 11/2004 | Broussard et al. | |
| 2004/0261099 A1 | 12/2004 | Durden | |
| 2005/0021940 A1 | 1/2005 | Ma | |
| 2005/0022242 A1 | 1/2005 | Rosetti | |
| 2005/0060745 A1 | 3/2005 | Riedl | |
| 2005/0091681 A1 | 4/2005 | Borden et al. | |
| 2005/0102529 A1 | 5/2005 | Buddhikot et al. | |
| 2005/0111467 A1 | 5/2005 | Ng et al. | |
| 2005/0179938 A1 | 8/2005 | Kayashima et al. | |
| 2005/0216942 A1 | 9/2005 | Barton | |
| 2005/0229213 A1 | 10/2005 | Ellis et al. | |
| 2005/0239402 A1 | 10/2005 | Gioscia et al. | |
| 2005/0261970 A1 | 11/2005 | Vuina | |
| 2006/0010226 A1 | 1/2006 | Hurtta et al. | |
| 2006/0015580 A1 | 1/2006 | Gabriel et al. | |
| 2006/0015925 A1 | 1/2006 | Logan | |
| 2006/0036750 A1 | 2/2006 | Ladd | |
| 2006/0041910 A1 | 2/2006 | Hatanaka et al. | |
| 2006/0047603 A1 | 3/2006 | Fontijn | |
| 2006/0047957 A1 | 3/2006 | Helms | |
| 2006/0088063 A1 | 4/2006 | Hartung et al. | |
| 2006/0089911 A1 | 4/2006 | Dandekar | |
| 2006/0116966 A1 | 6/2006 | Pedersen et al. | |
| 2006/0117365 A1 | 6/2006 | Ueda et al. | |
| 2006/0130107 A1 | 6/2006 | Gonder | |
| 2006/0130113 A1 | 6/2006 | Carlucci | |
| 2006/0130120 A1 | 6/2006 | Brandyberry et al. | |
| 2006/0167808 A1 | 7/2006 | Greene | |
| 2006/0168616 A1 | 7/2006 | Candelore | |
| 2006/0173787 A1 | 8/2006 | Weber | |
| 2006/0176884 A1 | 8/2006 | Fair et al. | |
| 2006/0195553 A1 | 8/2006 | Nakamura | |
| 2006/0200761 A1 | 9/2006 | Judd et al. | |
| 2006/0200865 A1 | 9/2006 | Leake | |
| 2006/0206565 A1 | 9/2006 | Ganesan | |
| 2006/0218604 A1 | 9/2006 | Riedl | |
| 2006/0248209 A1 | 11/2006 | Chiu et al. | |
| 2006/0253545 A1* | 11/2006 | Lakamp | 709/217 |
| 2006/0259927 A1* | 11/2006 | Acharya et al. | 725/61 |
| 2006/0277576 A1* | 12/2006 | Acharya et al. | 725/46 |
| 2006/0282319 A1 | 12/2006 | Maggio | |
| 2006/0291507 A1 | 12/2006 | Sarosi et al. | |
| 2006/0293954 A1 | 12/2006 | Anderson et al. | |
| 2006/0294371 A1 | 12/2006 | Fanning | |
| 2007/0022032 A1 | 1/2007 | Anderson et al. | |
| 2007/0022459 A1 | 1/2007 | Gaebel | |
| 2007/0033531 A1 | 2/2007 | Marsh | |
| 2007/0061331 A1 | 3/2007 | Ramer et al. | |
| 2007/0061336 A1 | 3/2007 | Ramer et al. | |
| 2007/0076728 A1 | 4/2007 | Rieger | |

(56) References Cited

U.S. PATENT DOCUMENTS

| | | |
|---|---|---|
| 2007/0077921 A1 | 4/2007 | Hayashi et al. |
| 2007/0078714 A1 | 4/2007 | Ott et al. |
| 2007/0088801 A1 | 4/2007 | Levkovitz et al. |
| 2007/0088832 A1 | 4/2007 | Tsang et al. |
| 2007/0094691 A1 | 4/2007 | Gazdzinski |
| 2007/0101359 A1 | 5/2007 | Schiller et al. |
| 2007/0106814 A1 | 5/2007 | Son et al. |
| 2007/0112685 A1 | 5/2007 | Yamamichi |
| 2007/0121612 A1 | 5/2007 | Nadeau et al. |
| 2007/0123253 A1 | 5/2007 | Simongini et al. |
| 2007/0124416 A1 | 5/2007 | Casey et al. |
| 2007/0124781 A1 | 5/2007 | Casey et al. |
| 2007/0136743 A1 | 6/2007 | Hasek |
| 2007/0136777 A1 | 6/2007 | Hasek |
| 2007/0157249 A1 | 7/2007 | Cordray et al. |
| 2007/0157260 A1 | 7/2007 | Walker |
| 2007/0166687 A1 | 7/2007 | Bell et al. |
| 2007/0168429 A1 | 7/2007 | Apfel et al. |
| 2007/0171274 A1 | 7/2007 | Yim |
| 2007/0204300 A1 | 8/2007 | Markley |
| 2007/0204311 A1 | 8/2007 | Hasek |
| 2007/0204314 A1 | 8/2007 | Hasek |
| 2007/0217436 A1 | 9/2007 | Markley |
| 2007/0220573 A1 | 9/2007 | Chiussi et al. |
| 2007/0220605 A1 | 9/2007 | Chien |
| 2007/0237330 A1 | 10/2007 | Srivastava |
| 2007/0247395 A1 | 10/2007 | Barraclough et al. |
| 2007/0265978 A1 | 11/2007 | Kahn et al. |
| 2007/0276864 A1 | 11/2007 | Espelien |
| 2007/0276925 A1 | 11/2007 | La Joie |
| 2007/0276926 A1 | 11/2007 | LaJoie |
| 2007/0294720 A1 | 12/2007 | Cohen |
| 2008/0009268 A1 | 1/2008 | Ramer et al. |
| 2008/0059409 A1 | 3/2008 | Montpetit |
| 2008/0098212 A1 | 4/2008 | Helms et al. |
| 2008/0155600 A1 | 6/2008 | Klappert et al. |
| 2008/0155607 A1 | 6/2008 | Klappert |
| 2008/0196056 A1 | 8/2008 | Bassett et al. |
| 2008/0209464 A1 | 8/2008 | Wright-Riley |
| 2009/0019134 A1 | 1/2009 | Bellifemine et al. |
| 2009/0034521 A1 | 2/2009 | Kato |
| 2009/0138922 A1 | 5/2009 | Thomas et al. |

FOREIGN PATENT DOCUMENTS

| | | |
|---|---|---|
| JP | 52039237 | 3/1977 |
| JP | 01226681 | 9/1989 |
| JP | 03272977 | 12/1991 |
| JP | 05017083 | 1/1993 |
| JP | 05058564 | 3/1993 |
| JP | 05201624 | 8/1993 |
| JP | 20020335507 | 11/2002 |
| KR | 10-2006-0009376 | 1/2003 |
| WO | WO 96/17306 | 6/1996 |
| WO | WO 99/29107 | 10/1999 |
| WO | WO 99/63759 | 12/1999 |
| WO | WO 00/18120 | 3/2000 |
| WO | WO 00/72592 | 11/2000 |
| WO | WO 01/10125 | 2/2002 |

OTHER PUBLICATIONS

Karen Jacobs (Dec. 7, 1999) "Elevator Maker to Add Commercial Touch," The Wall Street Journal, pp. 1-2.

Lewis Perdue (Jul. 20, 1999) "Forget Elevator Music, Here Comes Elevator Internet," Internet VC Watch, pp. 1-2.

Stevens Institute of Technology, Spring 1999 Final Report, pp. 1-12.

Kenji Yoneda, et al. (Dec. 1997) "Multi-Objective Elevator Supervisory-Control System with Individual Floor-Situation Control," Hitachi Review, p. 1.

Bodzinga, et al., "Enhancing the IPTV Service Architecture to Enable Service Innovation", International Engineering Consortium, May 1, 2006.

"Vsoft to Implement Its Advanced Videoclick Interactive TV Software on Power TV Based Digital Cable Set-Top Boxes", pp. 1-2, http://www.vsoft.com/press1999m.htm, Dec. 13, 1999.

"Vsoft to Present First Set-Top Box Implementation of Its Digital Video Software Platform, Targeted to Service Providers of Digital Video Services for Home Video", p. 1, http://www.vsoft.com/press1999j.htm, Sep. 8, 1999.

"3 Point Digital to Showcase Revolutionary Video-On-Demand at Streaming Media West '99", http://www.vsoft.com/press 1999nhtm, Dec. 3, 1999.

"Videodick 2.0 is Now Available on Sun Servers", p. 1, http://www.vsoft.com/press1999d.htm, Apr. 19, 1999.

Vsoft Launches Videoclick .COPYRGT. Home at IBC 2000, pp. 1-2, http:/www.vsoft.com/press2000o.htm, Sep. 8, 2000.

Margo Lipschitz Sugarman, "A Picture of the Future" pp. 1-2, http://www.vsoft.com/prints/picture.sub.--of.sub.--the.sub.--future.htm, Dec. 20, 1999.

Tom Butts, "Israeli Defense Technology Fuel's Vsoft's Software", pp. 1-2, http://www.vsoft.com/prints/israeli.sub.—defence.htm, Feb. 1, 1999.

Kevin C. Almeroth, IEEE Journal on Selected Areas in Communications, The Use of Multicast Delivery to Provide a Scalable and Interactive Video-On-Demand Service, pp. 1110-1122, vol. 14: No. 6, 1996.

Carnoy, David, "Anthony Wood and Mike Ramsey at War," Success, Mar. 1999, pp. 52-57.

Furchgott, Roy, "Don't People Want to Control Their TV's?" The New York Times, Aug. 24, 2000, p. G1.

Hamilton, David P., "Driving Force", The Wall Street Journal, Jun. 26, 2000, p. R12.

Lewis, Michael, "Boom Box", The New York Times Magazine, Aug. 13, 2000, p. 36.

Maxwell, Kim, Residential Broadband: An Insider's Guide to the Battle for the Last Mile, 1999, pp. 43-46, 308-312, John Wiley & Sons, Inc., New York.

Parsons, Patrick R., et al., The Cable and Satellite Television Industries, 1998, pp. 162-163, 170-172, Allyn and Bacon, Boston.

\* cited by examiner

PERSONAL CONTENT SERVER APPARATUS AND METHODS

RELATED APPLICATIONS

This application is a divisional of and claims priority to U.S. patent application Ser. No. 11/712,800 filed Feb. 28, 2007 of the same title, issuing as U.S. Pat. No. 8,181,206, which is related to commonly owned U.S. patent application Ser. No. 11/440,490 fined May 24, 2006 and entitled "Personal Content Server Apparatus And Methods", U.S. patent application Ser. No. 11/441,476 filed May 24, 2006 and entitled "Secondary Content Insertion Apparatus And Methods", U.S. patent application Ser. No. 11/080,693 filed Mar. 14, 2005 entitled "Method And Apparatus For Network Content Downloading and Recording", U.S. patent application Ser. No. 10/182,307 filed Jul. 26, 2002 entitled "System And Method For Providing Broadcast Programming, A Virtual VCR, And A Video Scrapbook To Programming Subscribers", and U.S. patent application Ser. No. 10/626,051 filed Jul. 24, 2003 and entitled "Technique for Providing a Virtual Digital Video Recorder Service Through a Communications Network", each of the foregoing incorporated herein by reference in its entirety.

BACKGROUND OF THE INVENTION

1. Field of the Invention

The invention relates to the fields of content storage and delivery over one or more networks such as for example cable television networks and other networks (e.g., the Internet).

2. Description of Related Technology

Recent advances in video capture and data storage technologies have led to the proliferation of consumer electronics devices that allow a user to record video programming or other content received from a bearer network (such as a cable television or satellite network) on a digital video recorder (DVR) or personal video recorder (PVR), and contemporaneously or subsequently access the content. Additionally, such DVR/PVR devices can also be used to transmit the stored content over a network interface to another device (which may or may not be remote from the DVR/PVR) where the same or another user can access the content.

However, such distribution of the content to a second device or location generally makes inefficient use of the available network bandwidth. For example, when the bearer network is cable television network, and the network interface comprises an internetworking (e.g., Internet) connection realized via a cable or other type of modem, the delivery of the content requires effectively twice the bandwidth it would otherwise require; i.e., first in the downstream direction to receive the content, and second in the upstream direction to transmit the program to the desired destination via the upstream channels (e.g., QAMs) associated with the DOCSIS or other modem architecture in use.

Exemplary prior art in this area includes the "Slingbox™" device manufactured by Sling Media of San Mateo, Calif. This device is capable of enabling a user to, inter alia, watch TV programming from various locations via an Internet-connected PC or similar device. The device utilizes an analog television (RF) tuner; when the user tunes to a given channel, the Slingbox encodes the video input received via the downstream delivery channels (e.g., QAMs or otherwise) in Windows Media or similar format. The encoded content is then streamed to a client application disposed on a Windows XP-based or similar PC via an IP network such as the Internet. Hence, the user can view the data locally (i.e., at the same premises) or remotely so long as they have access to the IP distribution network.

The Slingbox approach (and those similar thereto) suffers from several disadvantages. Specifically, in the case where the programming delivered to the premises is in digital format, the conversion of this digital program to analog format, and back again to digital, results in some degradation in media quality. Also, metadata such as closed captioning, teletext, etc. associated with a digital program is generally lost when converted to and back from the analog format.

Additionally, since the upstream bandwidth from a premises at which the Slingbox or similar device is installed is typically shared by multiple devices, other applications desiring to transmit data upstream may have to compete with the upstream transmission for the remote viewing session, thereby potentially leading to contention and reduced data rates for each user (especially if the Slingbox transmission enforces a minimum required upstream bandwidth for QoS or other considerations).

Similarly, because such use of remote viewing is constrained by the upstream bandwidth of a user's premises to the Internet, viewing high-quality, high-resolution programming such as high definition (HD) programming may be limited or even not available.

Furthermore, once a user makes the investment in a storage and streaming device such as the Slingbox, he/she is largely "locked into" the technology, and accordingly may have difficulty retrofitting the device with enhancements such as new developments in encoding technologies (e.g., new compression formats, new pre-processing techniques, etc.) for generating video for transmission to the remote location.

Aside from the upstream bandwidth requirements, retransmission of content actually present on a premises recording device has several additional disabilities, including the need to maintain the recording or storage device powered up at all times when an upstream transmission may be required, as well as the finite storage volume limitations of the device which can effectively limit the user's selection for content.

Moreover, the viewer must incur added expenses to establish a connection between his television network and the IP network (e.g., must obtain a cable modem and Internet service in addition to the MSO content delivery service). This connection must also have sufficient bandwidth to accommodate "slinging" of the desired content.

Prior art approaches such as Slingbox also generally do not provide a complete (or in some cases even partial) emulation of the user interface(s) associated with the user's premises hardware and software environments. Rather, control of the "slung" content may be performed via the interface that is available on the remote rendering device being used; e.g., a laptop computer. This may be as simple as a codec window (e.g., Windows Media or Real Player), which often provides only minimal control as compared to the full feature set afforded the user by their premises equipment. For example, VOD "trick mode", electronic program guide (EPG), or other such features may not be available or supported on the remote rendering platform. This causes the user to assimilate and remember the control scheme for their remote rendering device, as well as that for their premises environment, the two of which may be markedly different in terms of capabilities, layout, look-and-feel, etc. This is clearly not optimal for the user.

The prior art approaches described above also do not provide the opportunity for other user-driven features, such as interface with an EPG such as for reserving content for a future date/time.

Using the aforementioned prior art approaches, content owners also generally cannot protect their copyright and distribution rights, since the Slingbox or comparable device is generally agnostic to the content it is "slinging", as well as the location or address to which the content is being delivered. Hence, copyrighted content can be intentionally or unintentionally directed to remote domains or environments which may or may not have copyright protection or digital rights management (DRM) capability. In a particularly troublesome case, the remote device to which the content is transmitted may comprise a peer in a peer-to-peer (P2P) file-sharing network environment (such as Kazaa, Morpheus, etc.), thereby facilitating broad distribution of the copyrighted content over the P2P network, e.g., the Internet.

Content owners may further be concerned with the reproduction of copies of their content within the network for distribution purposes. For example, a network operator may have restrictions on replicating and/or distributing content received from the content source. Certain activities are generally recognized as not being in violation of a content owner's copyright. For example, so called "time shifting" (i.e., recording or storing the content for later viewing), and "space shifting" (i.e., moving content from one device or medium to another) of content owned by a purchaser in certain circumstances are recognized by U.S. courts as not violating copyrights. However, the application of such rules is typically quite fact-specific, and hence each situation must be individually analyzed. In short, the content source or copyright owner must have assurances that the network operator (e.g., MSO) which is entrusted with their valuable content will process and distribute this content within the limitations of the law, and not expose the content to undue risk of unauthorized reproduction or distribution.

Based on the foregoing, there is a need for improved apparatus and methods for enabling secondary (e.g., remote) access of content such as television programs without repetitious or inefficient use of network bandwidth. Such apparatus and methods would, in addition to efficiently and flexibly delivering content to one or more remote locations, also ideally protect the content by enforcing authentication and/or rights protection rules.

Additionally, when the network delivers programs in digital format, such apparatus and methods would preferably be able to preserve the high visual quality.

These features would also be provided using substantially extant network infrastructure and components, and would be compatible with a number of different client device and delivery systems including both wired and wireless technologies.

There is also a need to permit data such as content reservation information entered by a subscriber to "roam"; i.e., not be tied to the subscriber's premises device(s).

Moreover, in order to make the subscriber's remote content access experience as consistent with their premises experience, and as intuitive as possible, it would be desirable to have substantial overlap or emulation of the functions provided to the subscriber at their premises at the remote device.

SUMMARY OF THE INVENTION

The present invention satisfies the foregoing needs by providing improved apparatus and methods for the delivery of content over a network to one or more remote nodes.

In a first aspect of the invention, an improved personal content distribution system is disclosed. In one embodiment, the system comprises: a first network for distribution of content to a first device at a first location; a personal content server operatively communicating with the first network; and a second network in data communication with the content server and adapted to receive a request to access particular content from a second device at a second location remote from the first location. In one variant, the personal content server is further operative to receive reservation data from at least the first device, and utilize the reservation data in the delivery of reserved content to at least the second device.

In another variant, the first device and second device have at least one relationship, the relationship comprising the first device and the second device being associated with a common user or owner. The first network in this variant comprises a content-based cable or satellite network having a plurality of subscribers, the common user or owner comprising one of the plurality of subscribers. The association of the first and second devices with the at least one common subscriber is identified by the server by accessing a subscriber database having data relating uniquely to the first and second devices.

In another variant, the first device and second device have at least one relationship, the relationship comprising the first device having the particular content disposed thereon in either substantially permanent or ephemeral storage.

In yet another variant, the first network comprises a cable or satellite content-based network, and the second network comprises a cellular network adapted to distribute content to a plurality of mobile users, the second device comprising a mobile device. The first device and the second device are associated with a common user that is subscribed to receive first service over the cable or satellite network, and second service over the cellular network.

In still another variant, the first network comprises a plurality of subscribers, and the first device and the second device are associated with at least a common one of the plurality of subscribers, the association being determined at least in part by the at least one user providing authentication information via the second device.

In another variant, the access comprises delivery of the content to the second device, and the personal content server is operative to dynamically select at least one of the following for delivery of the content to the second device: (i) encoding/decoding format; (ii) conditional access format; and (iii) the network interface over which the content is delivered to the second device.

In another variant, the second device is capable of moving to a plurality of different locations within the second network, and the personal content server is adapted to authenticate the second device at each of the different locations.

In yet another variant, the personal content server is further operative to perform rate shaping on the delivered content.

In another variant, the reservation data comprises asset ID information relating to a program or service. The reservation data may also comprise e.g., data indicating a particular date and time for viewing a program or using a service.

In still another variant, the reservation data is segregated or organized into a multi-level hierarchy and stored on a storage device associated with the server.

In another variant, the reservation data is user-specific.

In a second aspect of the invention, a method of delivering content over a network is disclosed. In one embodiment, the method comprises: receiving a request to reserve content for future delivery via a first network from a first device; determining whether the content has previously been or is contemporaneously being delivered via a second network and a second device; and where the act of determining indicates that the content has been or is being delivered over the second network, allowing the content to be reserved for the first device.

In one variant, the first device and the second device are associated with a common user, yet disposed at substantially remote locations.

In another variant, the first device and the second device are disposed at a substantially common location.

In yet another variant, the content is reserved by the first device via a third network that is substantially independent of the first network.

In still another variant, the second device comprises a content recording device, and the act of determining comprises determining if the content has been recorded via the recording device.

In another variant, the act of determining comprises determining if the content has been purchased using a subscription account associated with a user of the first device.

In yet another variant, the first network comprises the Internet, and the second network comprises a cable television network, and the act of allowing comprises allowing reservation data to be sent over the Internet to a storage location associated with a content server disposed at a node of the cable television network. The reservation comprises a reservation for future delivery of the content over the cable television network using e.g., a video-on-demand (VOD) session.

In a third aspect of the invention, a network architecture adapted for delivery of content over a network is disclosed. In one embodiment, the architecture comprises: a server disposed substantially within a cable television network and adapted to serve a content request from a client device in communication with the cable television network; a content source in data communication with the server for providing content thereto; and a management process in operative communication with the server, the management process being adapted to service content delivery requests from a second device logically associated with but disposed remotely from the client device. In one variant, the management process is further adapted to: receive content reservation data from the client device; store the reservation data at a location accessible to the server; and deliver content to the second device directly or indirectly from the source based at least in part on the reservation data.

In another variant, the delivery of the content based at least in part on the reservation data comprises delivering content specified by the reservation data to the second device at a first time also specified by the data.

In yet another variant, the delivering content specified by the reservation data to the second device at a first time also specified by the data comprises delivering the specified content over an internet using a codec-over-IP format.

In still another variant, the delivering content specified by the reservation data to the second device at a first time also specified by the data precludes delivery of the content to the client device at a second time that is the same or similar to the first time.

In another variant, the logical association comprises association of both the client device and second device to a common cable network subscriber account.

In yet another variant, the receipt of content reservation data comprises receipt of data that is anonymously associated with the client device. The received data that is anonymously associated with the client device comprises a cryptographic hash of data particular to the client device. The logical association comprises e.g., association of both the client device and second device using at least the cryptographic hash.

In a fourth aspect of the invention, a client device architecture adapted for delivery of content over a network is disclosed. In one embodiment, the architecture comprises: a server disposed substantially within a cable television network and adapted to serve a content request from a client device in communication with the cable television network; and a management process in operative communication with the server, the management process being adapted to service content delivery requests from a second device logically associated with but disposed remotely from the client device.

In one variant, the management process is further adapted to: receive content reservation data from the client device; store the reservation data at a location accessible to the server; and permit the second device to access the reservation data after it has been authenticated to the management process.

In another variant, access by the second device comprises delivery of content reserved by the reservation data at a time specified by the reservation data.

In a fifth aspect of the invention, a method optimizing bandwidth usage within a cable television network is disclosed. In one embodiment, the network is capable of delivery of content to a first client device disposed within the network and a second, associated client device disposed remote from the first client device, and the method comprises: receiving content reservation data at a node of the network from the first client device, the data indicating content that is desired to be delivered at a given time to the first device; subsequently determining a condition when delivery of the reserved content is to be made to the second device instead of the first device; and allocating bandwidth within the cable network from at least one portion of the network based at least in part on the determining.

In a sixth aspect of the invention, a server adapted for delivery of content over a network is disclosed. In one embodiment, the server comprises: a computerized device disposed substantially within a cable television network and adapted to serve a content request a client device in communication with the cable television network; and a computer program operative to run on the computerized device, the program adapted to service content delivery requests from a second device logically associated with but disposed remotely from the client device.

In one variant, the computer program is further adapted to: receive content reservation data from the client device; store the reservation data at a location accessible to the program; and deliver content to the second device based at least in part on the reservation data.

In a seventh aspect of the invention, a method of delivering content to a first device over a first network is disclosed. In one embodiment, the first network is in data communication with a second network, the second network comprising at least one client device having a plurality of hardware control functions related thereto, the plurality of functions comprising a first user interface, and the method comprises: emulating at least a portion of the hardware control functions at the first device as part of a second user interface so as to at least partly emulate the first user interface; receiving at least one control command via the second user interface; and delivering the content at the first device according to the at least one control command.

In one variant, the act of emulating comprises performing a software emulation, and wherein display structures corresponding to at least a portion of the hardware control functions are generated for display on a display device associated with the first device.

In another variant, the act of generating display structures comprises generating structures that are also user-interactive, and the act of receiving comprises receiving input from a user via at least one of the structures.

In another variant, the act of emulating comprises performing a software and hardware emulation, and wherein a physical input device having functions corresponding to at least a portion of the hardware control functions is used with the first device, and the functions of the physical input device are emulated in software.

In yet another variant, the first device comprises a portable computerized device, the first network comprises the Internet, the second network comprises a cable television network, and the second device comprises a cable set-top box (STB).

In an eighth aspect of the invention, computerized apparatus adapted for receiving content over a first network is disclosed. In one embodiment, the first network is in data communication with a second network, the second network comprising at least one client device having a plurality of hardware control functions related thereto, the plurality of functions comprising a first user interface, and the apparatus comprises: a host computer; a network interface operative to communicate data with the first network; and software operative to run on the host computer and in communication with the interface.

In one variant, the software is adapted to: emulate at least a portion of the hardware control functions at the first device as part of a second user interface so as to at least partly emulate the first user interface; receive at least one control command via the second user interface; and receive the content at the first device via the network interface based at least in part on the at least one control command.

In another variant, the apparatus comprises a portable personal computer, and the first network comprises the Internet, the second network comprises a cable television network, the at least one client device comprises a set-top box or digital video recorder, and the plurality of hardware control functions comprise functions associated with a hand-held remote control unit operative to control the set-top box or video recorder.

In another variant, interface comprises an interface selected from the group consisting of (i) an Ethernet interface; and (ii) a WiFi interface.

In still another variant, emulation of at least a portion of the hardware functions is performed using software emulation, and wherein display structures corresponding to at least a portion of the hardware control functions are generated for display on a display device associated with the personal computer.

DETAILED DESCRIPTION OF THE INVENTION

Figure 1:
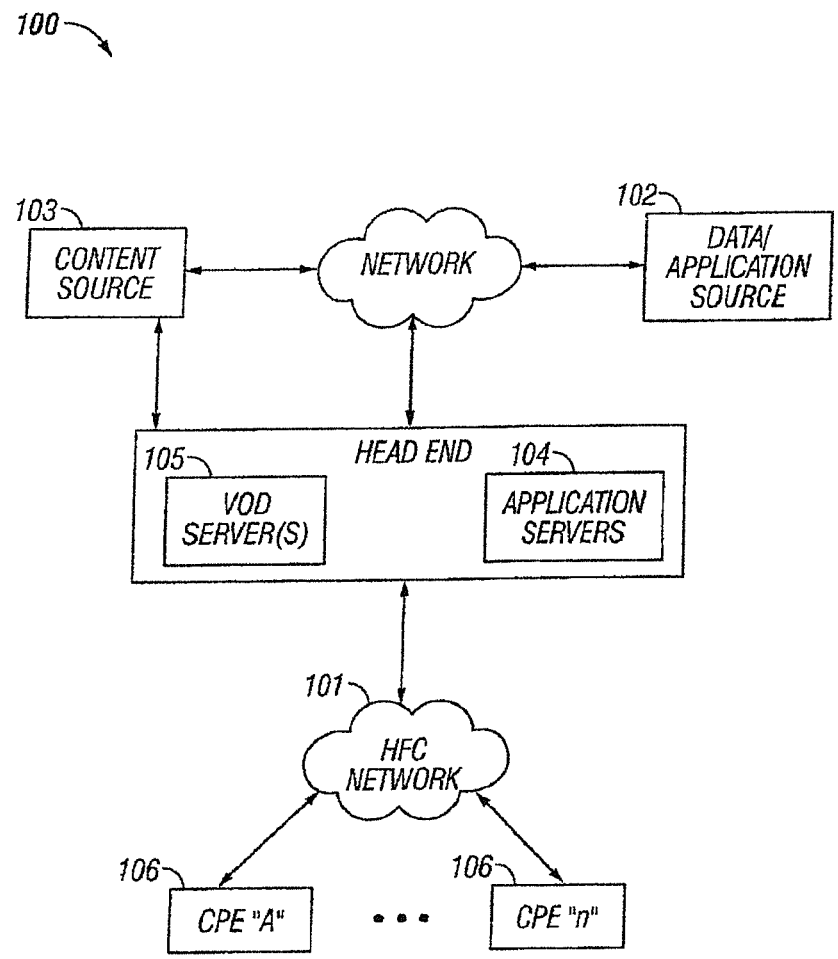
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), digital television sets, personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AVC/H.264, AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The to "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment or function whereby content sent over a network can be recorded and selectively recalled, including without limitation so-called "personal video recording" (PVR) functions or devices. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include any information source/receiver including, inter alia, free-to-air TV channels, pay TV channels, interactive TV, and the Internet. DSTBs may take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "interne" are used interchangeably to refer to inter-networks including, without limitation, the Internet.

As used herein, the terms "local" and "remote" refer generally to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may serve the very same premises.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple system operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "purchase" shall mean without limitation any sale, agreement for sale, transfer of funds, promise to transfer funds, barter arrangement, promotional or incentive agreement or arrangement, virtual ownership, subscription, or other relationship wherein consideration of any kind is exchanged between two or more parties (or their proxies).

As used herein, the term "QAM" refers to modulation schemes used for sending signals over cable networks. Such modulation scheme might use any constellation level (e.g. QPSK, QAM-16, QAM-64, QAM-256 etc.) depending On details of a cable network. A QAM may also refer to a physical channel modulated according to said schemes.

As used herein, the term "recording medium" refers to any material, component, collection of components or device adapted to store information in a substantially permanent or semi-permanent state. Exemplars of recording media include, without limitation, magnetic media, integrated circuits (e.g., RAM or ROM), optical media, chemical media, and atomic- and subatomic-level storage structures (e.g., crystalline structures, quantum or spin states, etc.).

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides, inter alia, improved apparatus and methods for allowing access to content (e.g., program viewing) delivered over a content-based network via other networks or communication channels outside of the content-based network. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network.

In one embodiment, the invention comprises a personal content server located, e.g., at the headend of the bearer (cable) network; this server distributes content to the remote requesting location(s), thereby eliminating repetitious traffic to and from subscriber's premises to fulfill the requests for remote content delivery.

In one variant, information relating to the requesting subscriber's prior activity for the requested content is used as a basis for authorizing delivery of the remote content. For example, the remote content manager may determine whether the requested program was previously stored on the subscriber's DVR attached to the local (cable) network. This information is gathered by either querying the DVR or by querying a process at the headend for the program titles stored on the DVR.

In another variant of the invention, when the subscriber wishing to access content (e.g., watch a program) from a location outside the bearer network does not have a DVR on his premises, the personal media management server communicates with either a "network DVR" or a "virtual DVR" maintained for the subscriber at the headend or other location outside of the subscriber premises in order to determine remote access privileges.

In yet another variant, activity or status of the tuner(s) within the local premises device is used as the basis for controlling or determining delivery of the requested content to the remote location; e.g., the remote user can watch that channel to which the premises tuner is currently tuned.

The requested content advantageously may comprise video, audio, gaming content, software applications, stored data, or any other form of data which can be delivered over a network. On-demand content delivery (including trick mode and similar functions) is also optionally supported through the establishment of a session between the remote client device and a VOD server within the cable headend and control using extant session and stream control protocols (e.g., LSCP).

Broadcast or "live" content can also be accessed via the secondary network approach of the present invention. For example, one variant allows the broadcast streams to be switched via the headend to the remote node via the secondary network (e.g., Internet, WAN, CSP network, etc.). Another variant of the invention places the content server function at a hub site of a broadcast switched architecture (BSA), thereby allowing for a close coupling between the hub switch state and the remote delivery for individual subscribers.

The improved methods and apparatus of the invention are readily implemented using substantially existing infrastructure, thereby obviating significant modifications or expense in implementing such capability. These methods and apparatus also provide other significant benefits including: (i) reduced cost of ownership for the user (i.e., instead of having to buy a separate external box, a consumer can simply subscribe to the service); (ii) ready upgrade of the subscriber's software (e.g., codecs, conditional access technology, and so forth) by avoiding a separate third party hardware environment within the subscriber's premises; (iii) eliminating upstream bandwidth contention between local premises communications or streams and the remote delivery stream (content is delivered from the headend or a node upstream of the premises, so no contention occurs); (iv) capability to remotely control and configure premises devices from the remote client device; (v) capability to monitor activity on the premises device remotely, and (vi) avoiding content quality degradation due to digital-to-analog-to-digital conversion processes.

In another aspect of the invention, security features and content protection can be preserved when delivering content remotely through a series of measures including content encryption, authentication, and even establishment of a trusted or authorized domain within the remote client device or network.

Methods and apparatus for dynamic secondary content insertion (e.g., replacement of dated or geographically inappropriate advertisements or promotions) are also described, as well as techniques for maintaining user/content anonymity (privacy) across the various delivery paths.

Methods and apparatus for remotely caching or storing useful data such as e.g., reservation data are also disclosed, thereby allowing a remote user to access reservations made via the premises environment.

A virtual or emulated user interface is also disclosed, thereby allowing a remote user to have substantially the same "look and feel" experience as they would if they were utilizing a device at their premises.

An operational and business rules "engine" useful in implementing various operational or business goals is also disclosed.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture used in conjunction with a "secondary" communication channel or network, the general principles and advantages of the invention may be extended to other types of networks and architectures where secondary delivery of content is required or desirable, whether broadband, narrowband, wired or wireless, content or data, or otherwise, and irrespective of topology. Hence, the following description is merely exemplary in nature.

It will also be appreciated that while described generally in the context of a network providing service to a consumer (i.e., home) end user domain, the present invention may be readily adapted to other types of environments including, e.g., commercial/enterprise, and government/military applications Myriad other applications are possible.

It is further noted that while aspects of the invention are described primarily in the context of 6 MHz RF channels within the HFC network, the present invention is applicable to any frequency/bandwidth, such as for example 8 MHz channels.

Moreover, while generally described in terms of content delivery over discrete QAMs or channels, relevant portions of the invention can be used in conjunction with multiplexing algorithm and wideband tuner apparatus such as that described in co-owned and co-pending U.S. patent application Ser. No. 11/013,671 filed Dec. 15, 2004 and entitled "Method And Apparatus For Wideband Distribution Of Content", incorporated herein by reference in its entirety.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical generalized content-based network configuration with which the personal media delivery apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

Furthermore, as discussed in greater detail subsequently herein, the generalized network of FIG. 1 also includes one or more interfaces to other (e.g., external) networks that can be used for the "personalized" delivery of content.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
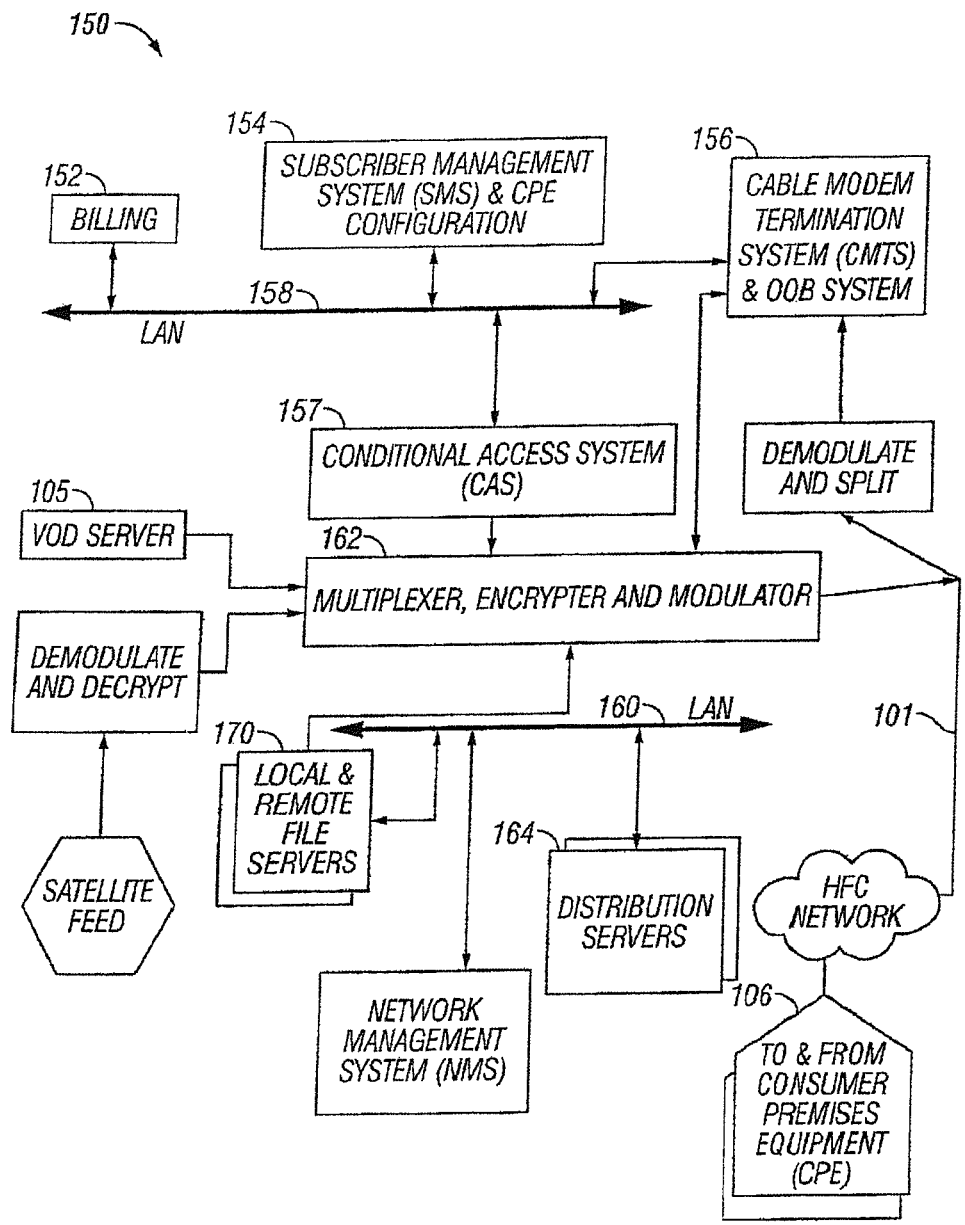
FIG. 1*a* is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
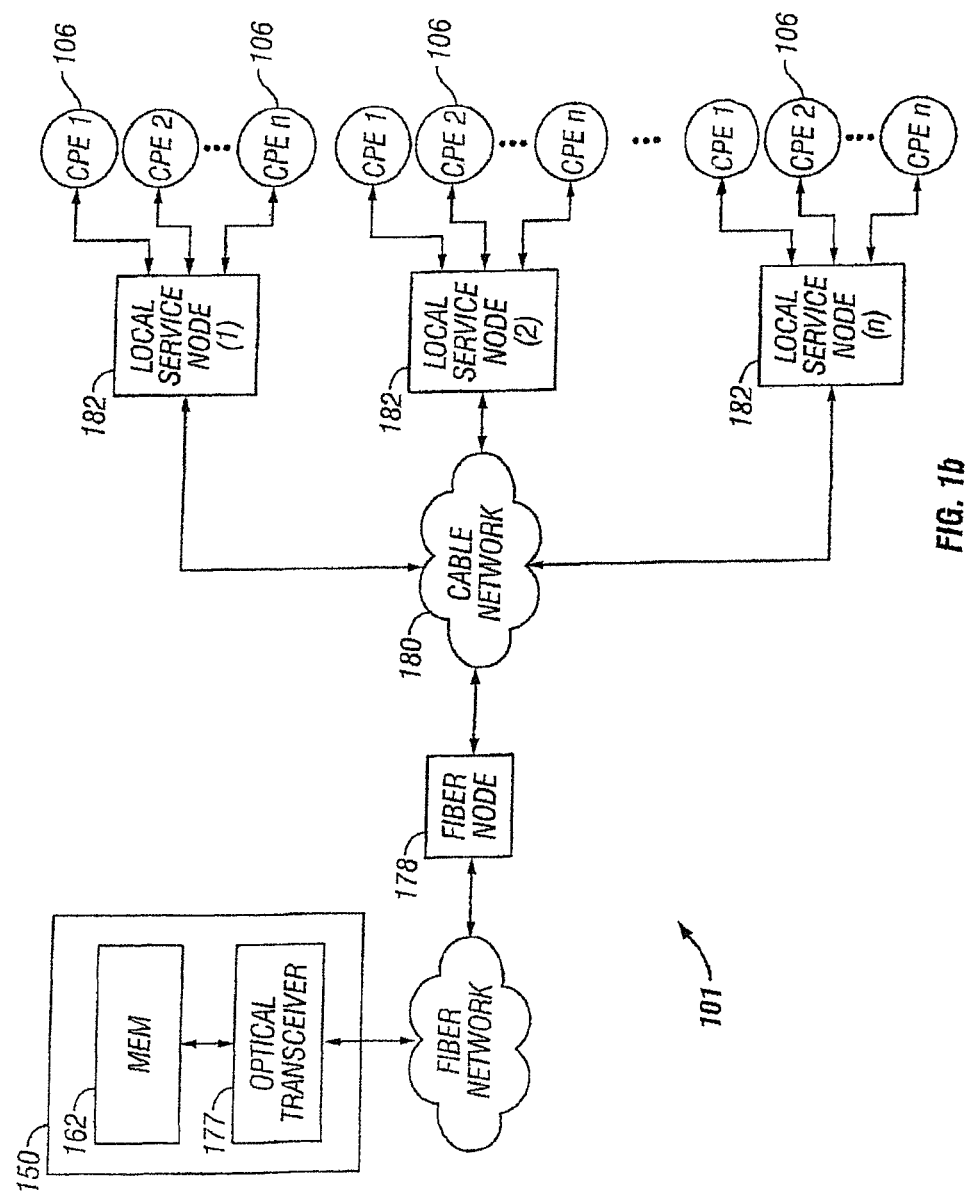
FIG. 1*b* is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
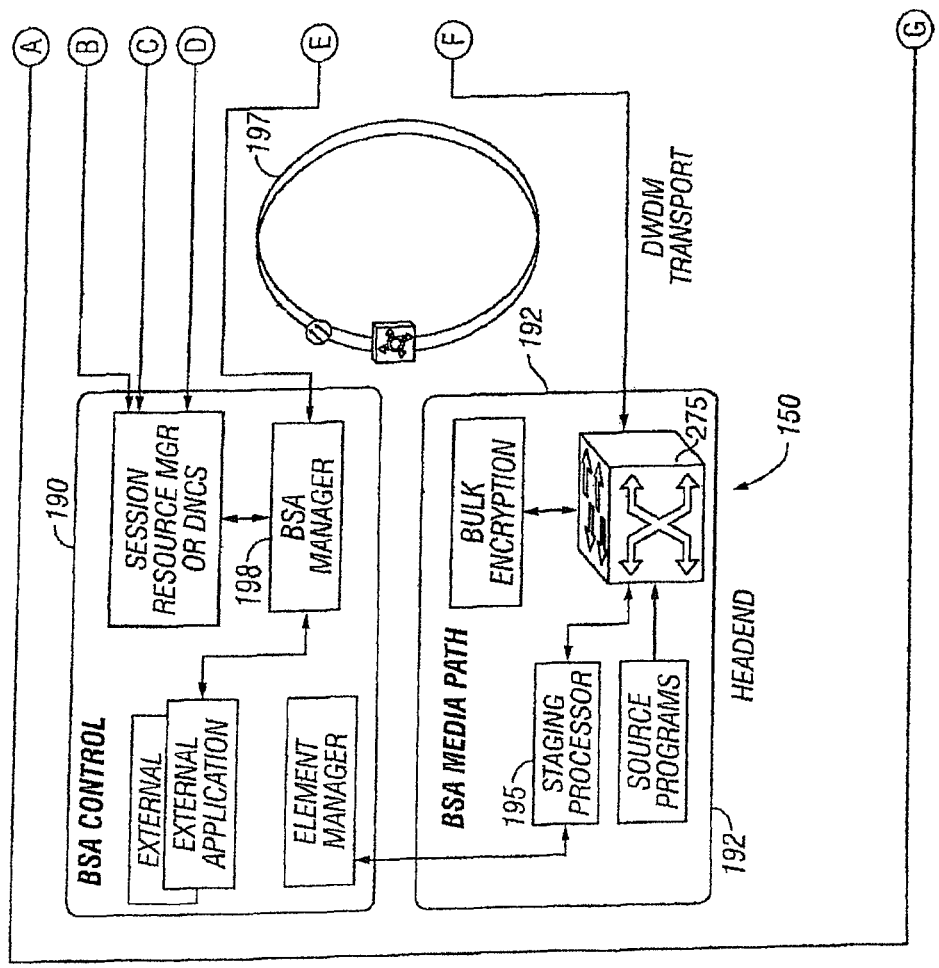
FIG. 1*c* is a functional block diagram illustrating one exemplary broadcast switched architecture (BSA) network useful with the present invention.
Figure 1C:
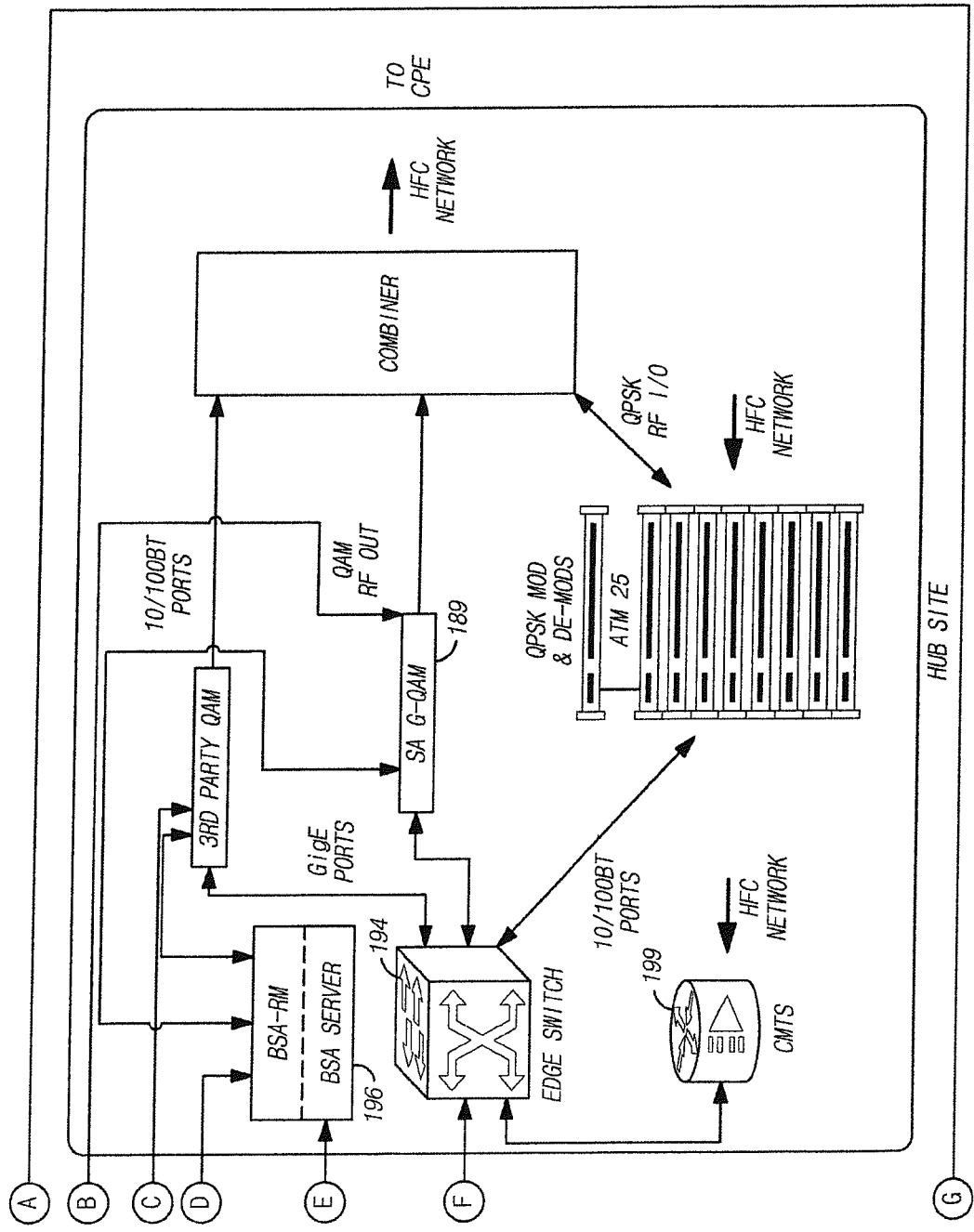

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Personal Content Delivery Architecture—

Figure 2:
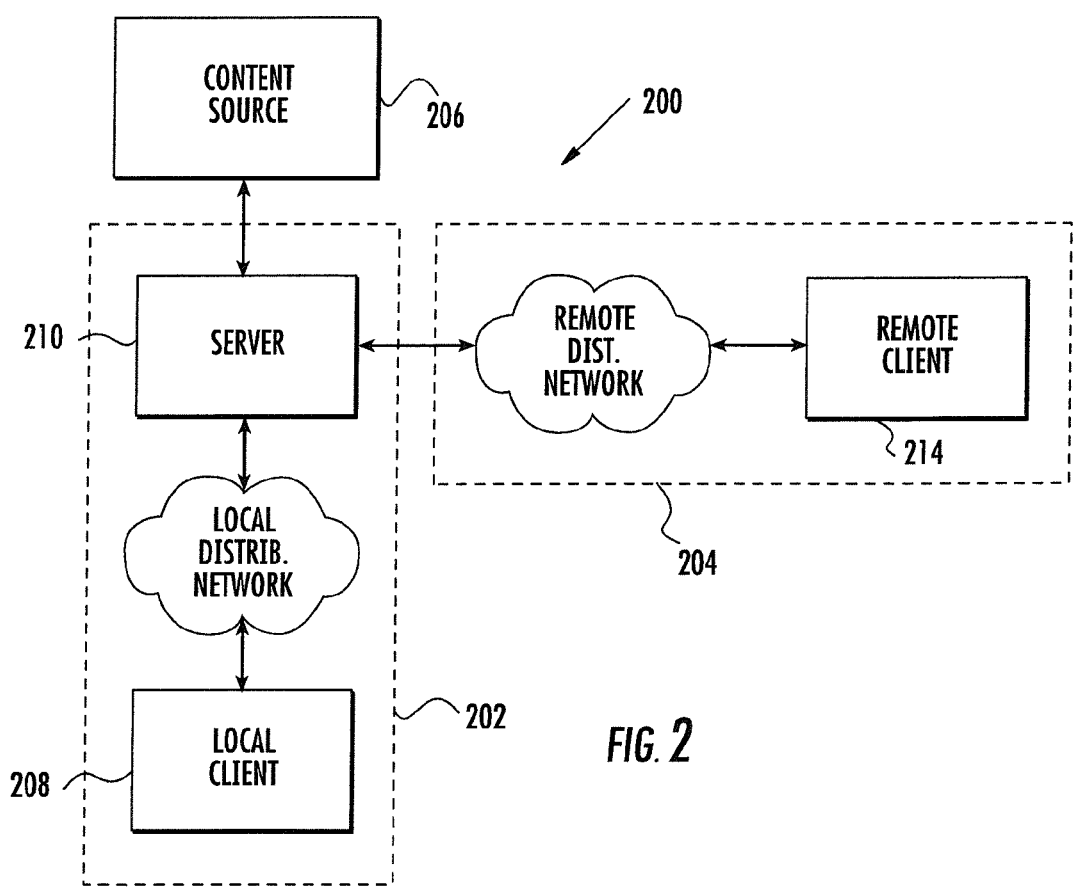
FIG. 2 is a functional block diagram illustrating one exemplary embodiment of the generalized content distribution architecture (CDA) according to the invention.

FIG. 2 is a functional block diagram showing an exemplary generalized architecture that implements the personal content delivery and related functions of the present invention. It will be appreciated that this generalized architecture may be readily integrated into the existing architecture of a cable television network (such as those shown in FIGS. 1-1c), or alternatively used in conjunction with other types of networks (e.g., satellite networks, DSL networks, etc.)

As shown in FIG. 2, the functional blocks in the illustrated system 200 are divided in two functional networks for simplicity of description: a local network 202, and a remote network 204. The content source 206 is shown supplying content to a server entity 210 within the local network 202, although it will be appreciated that the content source may supply the remote network directly or by proxy if desired (as controlled by the server entity 210).

The remote network 204 interfaces with the server entity 210, the latter receiving requests from a remote client device 214 (e.g., a PMD, remote PC, laptop, etc.). As discussed in greater detail subsequently herein, these remotely-issued requests are serviced by the server entity 210 based on one or more criteria.

It will be recognized that while the terms "remote" and "local" are used, these terms carry no specific connotation relating to distance or location, but rather are merely meant to differentiate between the various domains of the system 200. For example, the "remote" network 204 may actually be physically proximate or within a subscriber's premises along with the local network 202. Similarly, extensions of the local network 202, such as at the subscriber's premises via a LAN/WAN, or WiFi interface, may place the local client device 208 or LCD (e.g., a PMD, laptop, or other mobile device) more distant from the server entity 210 than the remote device.

Furthermore, while one of each the local and remote networks are shown in FIG. 2, two or more of each may be employed within the architecture, and in fact these multiple remote or local networks may communicate among themselves or between various of the illustrated components, such as where a plurality of remote client devices share a common server or infrastructure.

Figure 2A:
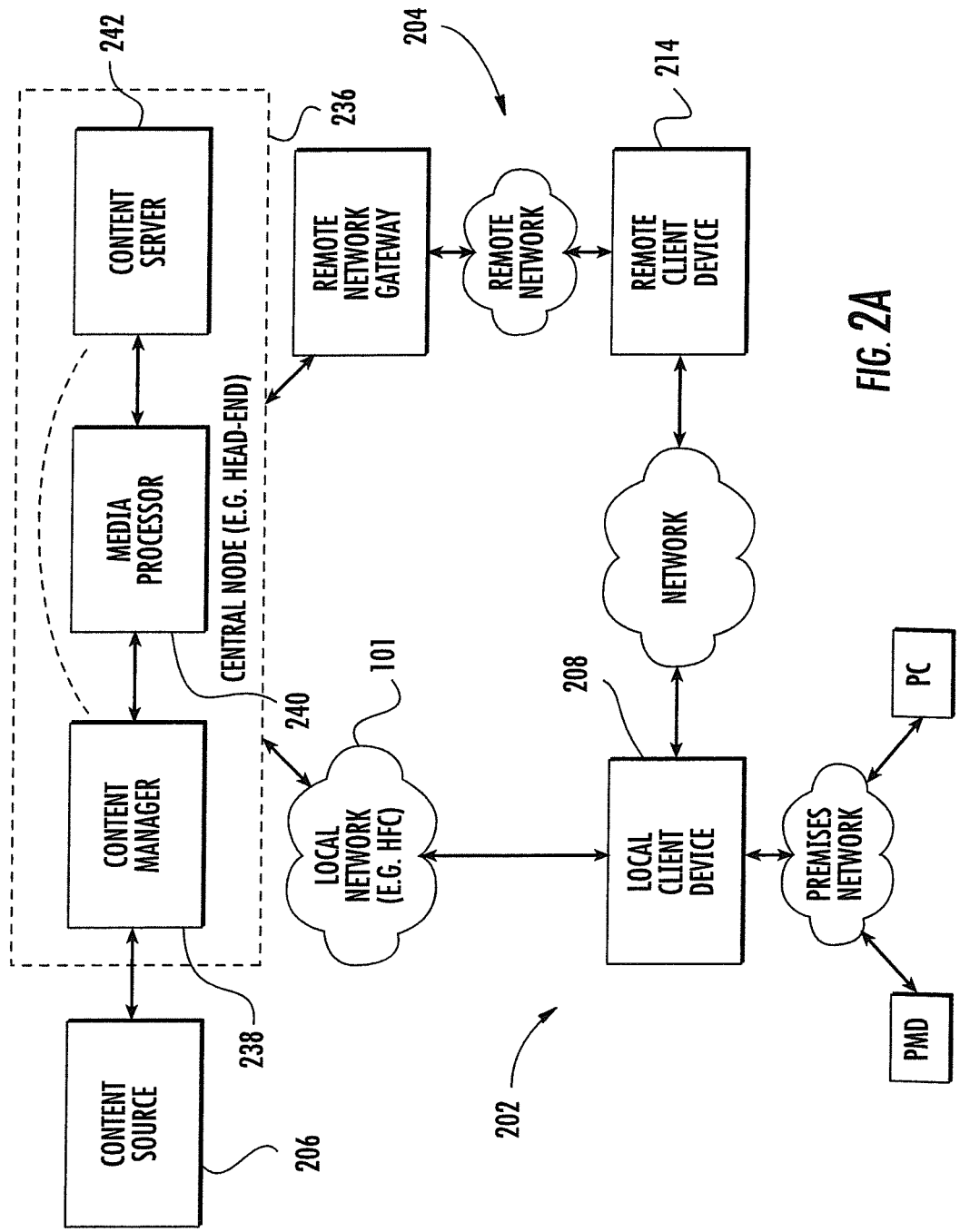
FIG. 2*a* is a functional block diagram of a first exemplary embodiment of the generalized architecture of FIG. 2, adapted for use with a typical cable television network.

FIG. 2a illustrates one exemplary embodiment of the personal content delivery architecture of the invention, adapted to a cable network. In this embodiment, a local access network 202 is used as the distribution network on which the subscriber receives his/her content (e.g., television programs), and to which a local client device (LCD) 208 located at the subscriber's premises is coupled. A central node 236 (e.g., cable headend 150) services the local network and includes a content manager (CM) 238, a media processor (MP) 240 and a content server (CS) 242 connected to each other and the local network 202 via a LAN or other comparable infrastructure at the headend.

The content manager 238, media processor 240, and content server 242 may be physically and/or logically integrated into one device or process, or maintained as separate devices/processes even located at disparate locations, as described further below. Alternatively, the function may be implemented in a distributed manner where one or more functional aspects are implemented on multiple platforms.

The content manager acts as the overall logical control or supervisory process for the remote content delivery functionality described herein. In this regard, the CM 238 acts as somewhat of an overlay onto existing logical and physical processes occurring within the network including, e.g., authentication of subscribers, instantiation of VOD sessions, switching of BSA hubs to deliver content to various subscribers, etc.

The media processor 240 acts to process media ingested by the headend 150 (or stored therein, etc.) before delivery to the requesting remote client device (RCD). For example, the RCD might require the media to be encoded in Real or AVC format versus MPEG-2, may require compression, etc. Alternatively, the bitrate of the local network program may be different than the bandwidth available to the RCD via the remote network. In such a case, the media processor 240 may perform the function of rate shaping the content using any number of different implementations recognized by those of ordinary skill. One such exemplary implementation performs rate shaping by setting a target rate where the input bitstream is converted to a constant bitrate stream. In another implementation, the rate shaping is performed based on feedback from the network connection between the streaming content source and the RCD. In yet another implementation, the rate shaping is performed in multiple stages, depending on hops in the network and their availability of downstream bandwidth.

In certain implementations, the media processor may also add or convert portions of the content before transmission. For example, the media processor may include a watermark or other steganographic or DRM data on outgoing video, or encrypt it (e.g., according to an AES or DES encryption algorithm).

The media processor function may also be implemented by storing multiple copies of the content suitable for a variety of network conditions, and picking the appropriate copy as needed. This method becomes especially useful when the remote or visited network is a network that supports a well known parameter set or requirement; e.g., a prescribed data transfer speed (such as e.g., 56 Kbps or 384 Kbps), QoS, etc.

The content server 242 may comprise any server capable of serving the content to the requesting RCD, including for example existing broadcast, application or VOD servers (FIG. 1) within the network. When a connection is established between the remote or visited network client device and the content server by the content manager, the content server assumes the responsibility of streaming programs to the RCD. Such transmission of audio/video programs may be accomplished using one of several possible transport technologies. For example, one exemplary implementation utilizes an Internet Streaming Media Alliance (ISMA) compliant server. Another implementation may comply the RFC-3550 specification published by the Internet Engineering Task Force (IETF). Other streaming server implementations are possible, and will be readily implemented by those of ordinary skill.

On the remote network side 204, a remote client device (RCD) 214 is in communication with the remote network 244 which in turn is coupled to the headend 150 via a remote network gateway (RNG) 246. The RNG can take any one of several forms, depending on the nature of remote or visited network. The exemplary RNG of FIG. 2a performs the function of policing communications going in and out of the remote network to the headend 150. In some embodiments, this may be accomplished at the transport layer of the communication protocol stack. In other cases, such policing may be performed at multiple layers of the communication stack. For example, a wireless access point contains traffic policing both at IP layer and additionally performs the function of converting IP traffic from and to wireless medium to wired Ethernet IP connections. The RNG may also perform additional functions such as acting as a proxy server and/or firewall.

The RNG may also be equipped with 802.1x/RADIUS authentication capability, in event barring communications issued by the RCD from passing without proper authentication by the RADIUS server. This approach helps limit "spoofing" of the headend processes (including the content manager) by surreptitious entities seeking to gain unauthorized access to the content distributed by the MSO. This can also be used as part of a multi-layer system; such as where the aforementioned 802.1x/RADIUS function or similar is layered with an independent authentication performed by the TA or a designated proxy (e.g., trusted authentication authority).

The exemplary architecture of FIGS. 2 and 2a make no assumptions about the remote network, other than that the remote network be able to support communication with local headend servers and be able to deliver content to the RCD(s). Consider the case where a user is at their place of work, accessing personal media from their home over the Internet. In such an example, the remote network 204 comprises a corporate intranet that supports IP transport and provides access to the Internet (an interposed "remote" network).

Another example of a remote network according to the invention is a wide area wireless network such as cellular telephony network. In such a case, the remote network must be capable of following user commands from his/her mobile phone to reach the headend servers, and also be able to forward personal media streamed by the content server 242 to the RCD. Exemplary methods and apparatus for implementing such connectivity and interoperability between an MSO network and a cellular or other such mobile device network are described in co-owned and co-pending U.S. patent application Ser. No. 11/258,229 filed Oct. 24, 2005 and entitled "Method and Apparatus For On-Demand Content Transmission and Control Over Networks", incorporated herein by reference in its entirety. This disclosure provides exemplary apparatus and methods for accessing data (such as video, audio or data files) over a network according to download or "on demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

In one embodiment, session establishment and data flow control are advantageously implemented using protocols and bandwidth that are typically used for delivery and control of streaming multimedia to a subscriber's LCD 208, such as a cable network's VOD infrastructure. The content delivered may be an MPEG transport stream, for example, in either standard definition (SD) at 175 Mbps, or high definition (HD) at 15 Mbps (or any increments or multiples thereof).

The receiving client device, via a fixed- or soft-function key or other such user interface, can also invoke FF, REW or other "trick mode" functionality with respect to the video streamed over the wireless network (and any intermediate fiber/wired links within the IP network). This feature can also be used as a complement to other existing modalities, such as "real time" streaming or simply transferring the complete video/audio data file(s) to the requesting client for storage (and provision of "trick mode" functions) thereon.

The on-demand content provided to a subscriber's mobile device can be billed to the same MSO account held by the subscriber for the cable network services provided to the subscriber's premises. This allows for a convenient "bundling" of services, obviating a need to pay for access to this additional on-demand content on a separate bill or billing account.

The on-demand access of content according to the invention is also advantageously agnostic to the type of session establishing protocol or data transfer protocol used, thereby allowing the transfer of content to a client mobile device over virtually any type of multimedia-capable cellular or wireless bearer network (including e.g., 3G, CDMA, TDMA, 802.11, etc.).

The present invention can make use of packet-over-circuit technologies to extend its reach; e.g., use of UMTS CDMA air interface, RAN, etc. Almost all current cellular phones have WAP or similar Internet access technology (which accesses distant WAP server site via a gateway or similar infrastructure), but these are generally not equipped to handle any significant download sizes due to very limited bandwidth. The exemplary use 3G IMS increases bandwidth significantly, and hence is a natural choice to carry video content (even streamed).

The disclosed apparatus and methods also advantageously provide for upload of content to a server or other network entity, and the uploaded content can then be downloaded and "VOD'd" by a linked subscriber. For example, using a cellular phone camera, microphone, etc., user can stream video up to the VOD server for download/VOD access by others who have authorized access to the content-based network (perhaps other family members or friends), so these other persons can watch the uploaded content on their LCD 208 or other desired platform (e.g., PC).

Another example of remote network comprises a user connection to the Internet over a wireless network or interface. One such wireless network might comprise an 802.11 a/b/g/n network, PAN, or 802.16 WiMAX interface.

Yet another example of a remote network comprises an Internet Service Provider's (ISP) network when the user accesses the Internet through his ISP connection and then makes a request over the Internet to view personal media form the MSO (local) network.

Alternatively, the RCD may comprise a WAP-enabled client (e.g., PDA or other PMD) that interfaces with a WAP gateway, the latter which may comprise or be integrated with the remote network gateway (RNG) previously described.

It will be appreciated that the present invention also contemplates situations when the subscriber/RCD is not static in the remote network 204, but is mobile within that network, and may also transition from one remote network to another. Because the personal content delivery of the present invention can be implemented by delivery technologies that typically are enabled for such mobility, IP or comparable mobility solutions can be used consistent with the invention in order to ensure that a subscriber is able to receive their content when making a transition from one network to another. In one embodiment, the exemplary content manager 238 or MP 240 may contain a functional process (e.g., algorithm) that monitors for such transitions, including changes in bandwidth available for media streaming. For example, when a subscriber makes transition from a wide area network such as 3G network to a more localized 802.11 Wi-Fi network, the bandwidth available for streaming may increase substantially. The MP 240 then will be appropriately instructed by the algorithm, such as via inter-process messaging or communication between the CM 238 and the MP 240, to increase the bandwidth of outbound personal content streaming session.

The present invention can be used with any device capable of communication over the network and capable of receiving and utilizing the distributed content (e.g., displaying video streams). The RCD may comprise a wired device, such as a laptop or desktop personal computer or wireless receiver. The RCD may implement receive, decode and display capabilities for content on a single platform (e.g., a mobile phone), or on more than one platforms (e.g., a cable or other modem, and a PC connected to the modem and capable of decoding and displaying media).

The RCD may also have the ability to provide enough credentials on behalf of the user/subscriber, so that the content manager 238 is able to ascertain that the content access request is from a subscriber of the local network service (e.g., MSO). This capability may be implemented within the RCD via, e.g., a user interface for the subscriber to be able to provide username/password, or alternatively in the form of a digital authentication technology such as a SIM card for mobile phones.

The content source 206 shown in FIG. 2a may comprise any source of content accessible to the headend 150 including, without limitation, third-party websites, studio content repositories, dedicated (e.g., RAID) or other storage, local MSO storage (e.g., that used for VOD or similar purposes), live or broadcast feeds from networks, and so forth.

Furthermore, it will be recognized that virtual content recording services and apparatus may be used consistent with the present invention in order to provide, inter alia, extended storage capabilities and access to the remote (or local) subscriber(s). See, e.g., the methods and apparatus disclosed in co-owned and co-pending U.S. patent application Ser. No. 10/626,051 filed Jul. 24, 2003 and entitled "Technique for Providing a Virtual Digital Video Recorder Service Through a Communications Network", which is incorporated herein by reference in its entirety. In this manner, the size of the accessible "library" of stored content available to a subscriber is not limited to that of physical devices on their premises. For example, were the system of FIG. 2a to be configured according to one exemplary embodiment (described in greater detail subsequently herein) that restricts remote access to content which the requesting subscriber has downloaded and recorded on their premises DVR, the population of such content could be quite limited, since the physical capacity of DVR devices is comparatively small (even if a removable recording medium is utilized). To the contrary, "virtual" or remote storage (e.g., at the headend or another site) expands the storage space (and hence the number of titles available to a user remotely via the aforementioned system operating paradigm) to an almost infinite amount, especially if the network operator utilizes virtual storage of their own.

Figure 2B:
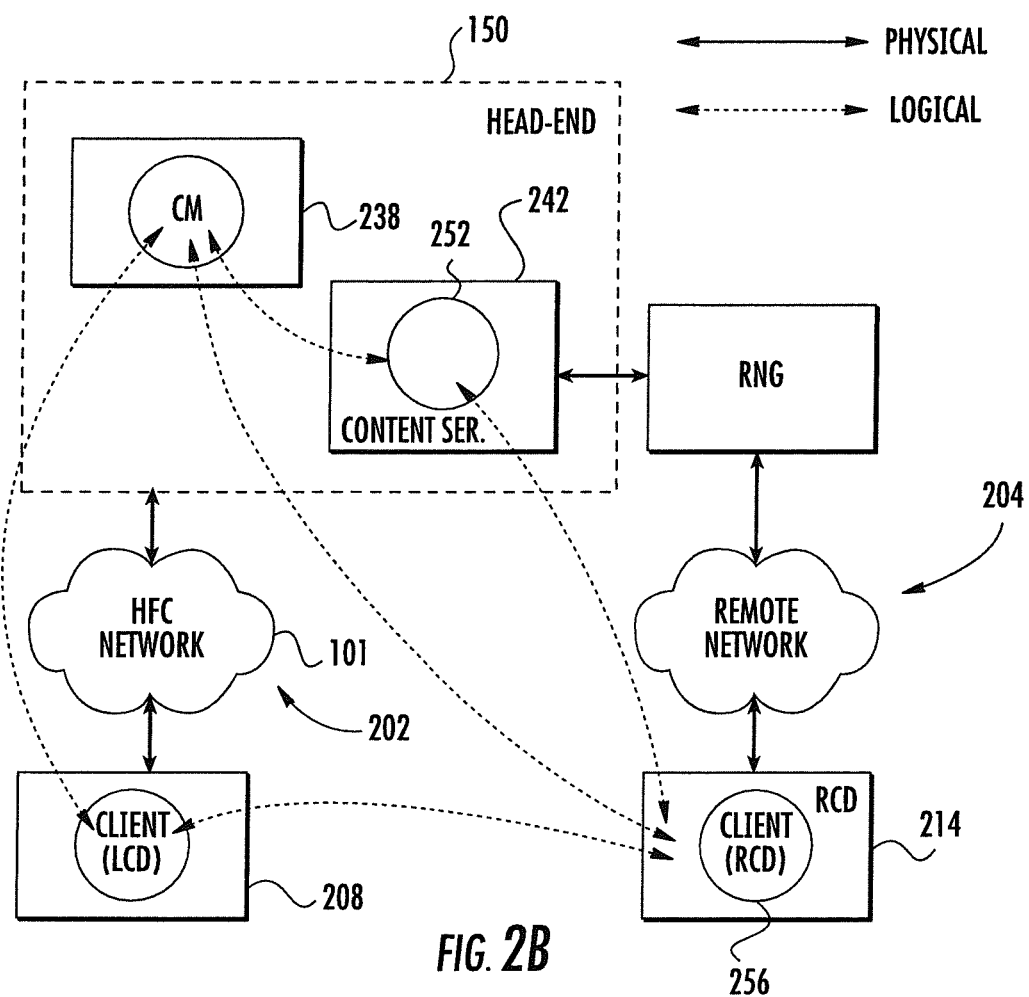
FIG. 2*b* is a graphical representation of one exemplary embodiment of a software architecture useful with the content delivery architecture of FIG. 2*a*.

FIG. 2b illustrates an exemplary software architecture useful with the invention. In the illustrated embodiment, the software architecture 250 comprises a distributed application (DA) comprising a server portion 252 as well as a local client portion 254 and a remote client portion 256. The content manager 238 functionality may be integrated into the server portion 252, or alternatively comprise a discrete or standalone module having inter-process communication with the server portion (or portions where multiple content servers and server portions are used in conjunction with the content manager 238). The client portions 254, 256 advantageously need not be in direct communication with one another, but rather can communicate only with the server portion 252 which, in conjunction with the CM 238, enforces rules relating to delivery of content relating to the LCD and the RCD as described in greater detail subsequently herein.

Figure 2C:
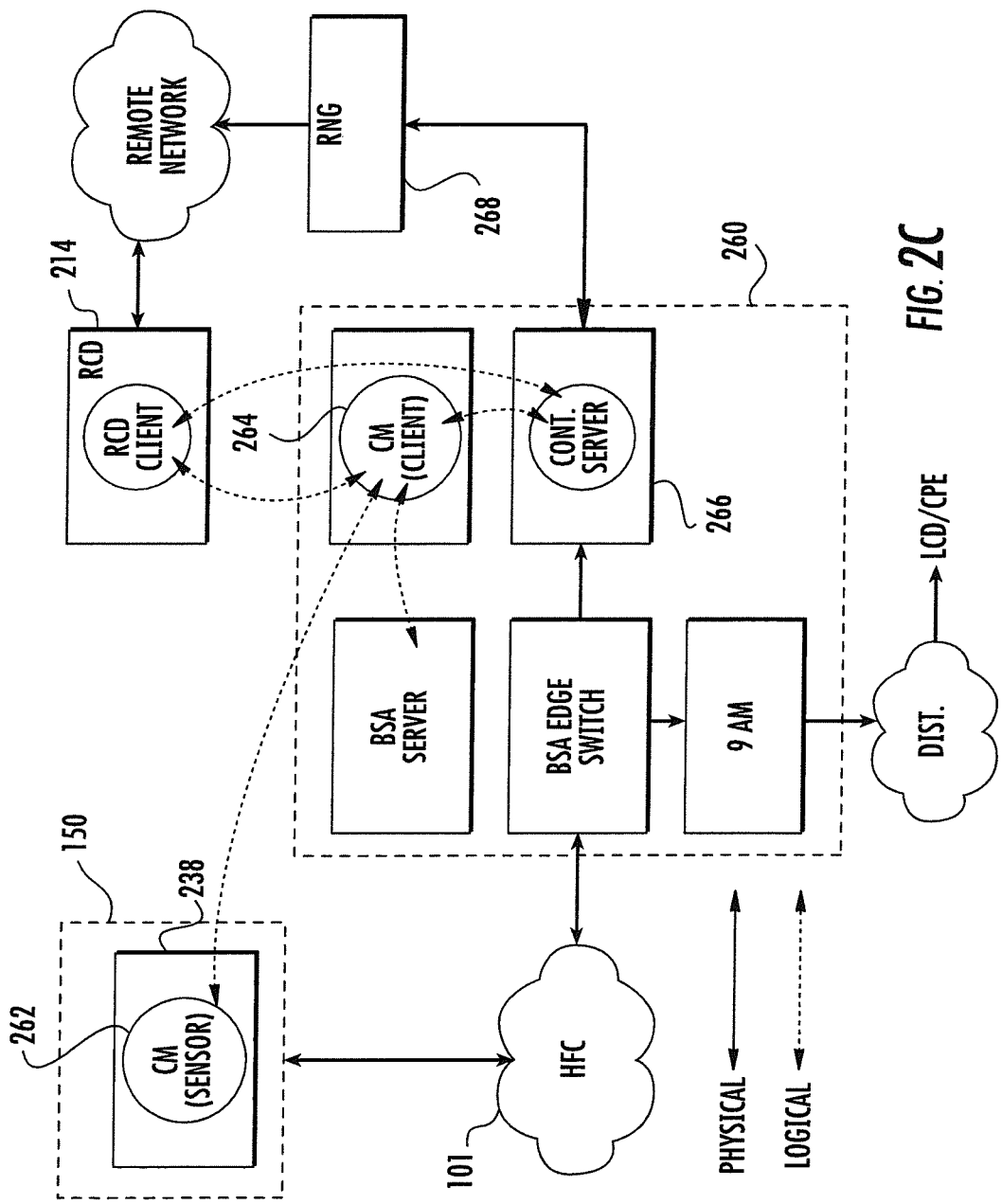
FIG. 2*c* is a functional block diagram of a second exemplary embodiment of the generalized architecture of FIG. 2, adapted for use with a broadcast switched architecture (BSA) cable television network.

FIG. 2c illustrates an alternate embodiment of the content delivery architecture of the invention; except adapted to a broadcast switched architecture (BSA) cable network of the type previously illustrated in FIG. 1c. In this architecture, at least some of the content manager (CM) functions are pushed out closer to the network edge, such as at the illustrated BSA hub site 260. The CM function, for example, may comprise a distributed application (DA) having a "server" portion 262 running at the headend 150, and a client portion 264 running at the BSA hub (e.g., on the local content server 266). A local gateway 268 is also provided for direct access to the remote network 204 and RCD. This approach has the advantage of, inter alia, decentralizing the remote content access and delivery functions, especially under a broadcast paradigm. For example, in one variant, the state of the BSA hub switch (e.g., whether the switch is selected so as to deliver particular content to a given subscriber) is fed to the local content manager 264 so as to allow immediate determination or evaluation of requests for content received from the remote network 204. If the content is switched on for the requesting subscriber at the BSA switch, the remote access request is authorized, and the content ported to the remote gateway 268 for delivery to the remote device.

The architecture of FIG. 2c can also be used in parallel with other distribution architectures (e.g., that of FIG. 2a) to provide a heterogeneous capability; i.e., remote requests for broadcast content are handled by the hub site, while remote requests for VOD content are handled by the headend 150 and associated content/VOD server(s).

One advantage provided by the present invention is the ability for the headend 150, BSA hub site, or other such network node to transmit or relay content in a packetized digital format to the network address of the RCD, thereby avoiding the potentially signal-degrading analog-to-digital conversion previously described under prior art approaches.

Another advantage of such a system is the use of the same strong encryption used to deliver the high-value content over the local network when sending the content stream to the subscriber's remote or visited network.

Furthermore, another advantage provided by the architecture used in the exemplary embodiments of the invention relates to the fact that upstream bandwidth limitations that would be imposed upon prior art solutions such as the Slingbox are not present in this architecture. For example, it is possible that between the content server and the remote client device 214 located in the visited network, comparatively high (e.g., multi-megabit) bandwidth is available for streaming content. Accordingly, the quality of programming that can be streamed using this high-bandwidth connection or network is higher, since the architecture is not constrained by the typical upstream bandwidth rates (e.g., 384 Kilobits per second in a typical cable system) that support only a minimal quality video. Hence, by removing the "choke point" of the upstream channels from the premises to a distribution node, delivery of the content from the headend or other upstream node in the network to the client in the remote network can occur at potentially greater bandwidths. This can be analogized to removing a flow restriction in a pipe capable of carrying much higher flow rates than those which the restriction can accommodate.

Moreover, the limited upstream bitrates associated with the prior art techniques make it effectively impossible to stream high definition (HD) programming. In contrast, according to one embodiment of the present invention, high definition (HD) programs can be streamed to the visited network client device since the upstream "bottleneck" of the downstream or edge portions of the MSO distribution network is removed.

Remote RCD Configuration—

In another embodiment of the invention, the RCD can be dynamically configured by content manager 238 (or content server 242) in order to enable certain types of functionality. This dynamic configuration approach can be extended to, e.g., the codec configuration (e.g., MPEG-4, AVC, Real, etc.), the conditional access (CA) technologies, and network interfaces associated with delivery of the content, such as via the exemplary methods and apparatus of co-owned and co-pending U.S. patent application Ser. No. 11/363,577 filed Feb. 27, 2006 and entitled "Methods and Apparatus for Selecting Digital Coding/Decoding Technology for Programming and Data Delivery", U.S. patent application Ser. No. 11/363,578 filed Feb. 27, 2006 and entitled "Methods and Apparatus for Selecting Digital Access Technology for Programming and Data Delivery", and Ser. No. 11/364,147 filed Feb. 27, 2006 and entitled "Methods and Apparatus for Selecting Digital Interface Technology for Programming and Data Delivery", respectively, each of the foregoing being incorporated herein by reference in its entirety. For example, one RCD 214 may have a Powerkey or similar CA capability, while another is enabled for downloadable conditional access (DCAS) within its trusted domain. Accordingly, the headend server process can configure the CA aspects of the content as appropriate for the relevant CA context, and also trigger other processes (such as DCAS download, key negotiation, etc.) necessary to facilitate the playback of the requested content. In this regard, the server process 242 can be made "self healing"; i.e., where the requesting RCD is not properly configured to play back the content, the necessary configuration changes can be instituted automatically to provide a seamless appearance to the remote user.

The CM/content server can also instantiate a trusted domain within the RCD if one does not already exist. For example, using a downloadable CA (DCAS) approach, the necessary software and firmware if any can be downloaded to the RCD, thereby enabling designation of the RCD as a trusted domain for handling content. Exemplary trusted domain apparatus and methods are described in co-owned and co-pending U.S. patent application Ser. No. 11/006,404 filed Dec. 7, 2004 and entitled "Technique For Securely Communicating And Storing Programming Material In A Trusted Domain", incorporated herein by reference in its entirety, although it will be recognized that other approaches may be used.

Similarly, exemplary methods and apparatus for establishing a downloadable conditional access (DCAS), DRM, or TD environment within a device or domain of a content-based network are described in co-owned and co-pending U.S. patent application Ser. No. 11/584,208 filed Oct. 20, 2006 entitled "DOWNLOADABLE SECURITY AND PROTECTION METHODS AND APPARATUS", incorporated herein by reference in its entirety, although other approaches may be used with equal success.

In one embodiment, an authorized service domain (ASD) approach is utilized for protecting content delivered to the RCD 214. The exemplary configuration of the ASD comprises a UPnP digital rights management technology that is used by the network operator to protect content using security credentials of a multi-stream cable card or secure microprocessor disposed on the RCD 214. An exemplary ASD service (ASDService) defines a service that runs on the content server 242 and is invoked by the RCD (or the CM 238). The ASDService process in defined for exchanging and authenticating security credentials to the RCD (and any connected devices within the RCD domain).

The exemplary ASDService described herein abides by the UPnP AV Architecture for browsing content, setting up connections, transporting content and finally controlling the flow of the content between devices, although this is by no means a requirement for practicing the invention. The ASDService is a precursor to the UPnP general playback process, and is executed before the remote device can browse as ASD content directory (e.g., maintained by the content server 242 or CM 238) or allow playback.

The exemplary ASD Service also allows an ASD capable rendering device (e.g., RCD) to scan the remote or local domain networks for ASD capable "servers". Once identified, the RCD can request authentication from the ASD capable servers to view the ASD content directory. The RCD 214 or its proxy selects content from the directory and submits its ASD credentials along with the content ID or other data identifying the content of interest in order to gain access from the server. The submission of the security package is required each time a RCD accesses content in order for the server to maintain counters to comply with "copy once" and "copy never" classified content.

Secondary Content Insertion—

In another aspect, the present invention utilizes a dynamic secondary content (e.g., advertisement) insertion process that gives the network operator the opportunity to provide secondary content such as advertisements that are more tailored or better suited for the primary content (e.g., programming) than that associated with the primary content when it is transmitted to and stored on the subscriber's local or premises equipment (e.g., DVR). Because a program in the exemplary embodiment is streamed from the headend server (e.g., the content server 242) or another network node upstream of the LCD 208, a decision is made at the time of streaming or delivery of the primary content whether to insert relevant advertisements or other secondary content that is more logically proximate to the primary content or other network context than that associated with the original delivery of the content that is being used as the reference for establishing the current requester's access.

As used herein, the term "logically proximate" refers to secondary content which bears some direct or indirect logical relationship to the primary content. For example, a logically proximate advertisement for the movie "Pirates of the Caribbean" might be one for Disneyland, which includes a "Pirates of the Caribbean" theme ride.

The term "network context" refers to secondary content which bears some logical or deterministic relationship to one or more network operational, business, or other parameters. For example, logically proximate secondary content based on network context may be that which is properly encoded to be delivered over the relevant distribution path, which fits the allotted time, which maximizes bandwidth or profits, etc.

Hence, while the original delivery of the target primary content might have advertising that is effectively randomized in terms of logical proximity or network context, the network operator can, using the apparatus and methods of the present invention, dynamically adjust the secondary content based as desired before it is delivered to the remote user/RCD.

Such functionality also allows for the substitution or replacement of secondary content which is less suited to the present context or environment, or which is dated. For example, a promotion such as "Tonight on NBC" becomes less relevant when the primary content is watched by the subscriber three days later than the original airing of the promotion. However, using the method of the present invention, the promotion could in fact relate to a program that is scheduled to be broadcast on the day that the subscriber watches the promotion. This can be readily determined by any number of means, such as e.g., using the date/time reference associated with the network (e.g., SI reference) as compared to metadata relating to date/time associated with the content. In the context of the foregoing exemplary promotion, the promotion might carry "date relevance" data or the like in the form of metadata, which can be read and evaluated by the exemplary advertising or secondary content insertion algorithm (not shown) included within the CM 238, or running on the content server 242. The insertion algorithm of the exemplary embodiment can, for example, select secondary content which is contextually, temporally and/or logically related to one or more elements of primary content, the network context, and so forth.

Another example of selective replacement of secondary content relates to geography or location; e.g., a promotion for a sports event for a local team, or local news, etc. might have limited applicability to a subscriber who is located out of the geographic area. Accordingly, one embodiment of the invention uses secondary content that contains geographic metadata when stored, the metadata being used as the basis for insertion based on a particular geographic location.

It will also be recognized that other types of information may also be included with the primary content that is delivered to the requester in the remote or visited network. For example, one variant of the invention comprises the inclusion of closed caption (cc) data, such as for example through use of the methods and apparatus described in co-pending and co-owned U.S. patent application Ser. No. 11/298,247 entitled "Caption Data Delivery Apparatus and Methods" filed Dec. 9, 2005 and incorporated herein by reference in its entirety. Similarly, emergency alert (e.g., EAS) data can be included for example using the methods and apparatus of co-pending and co-owned U.S. patent application Ser. No. 11/299,169 entitled "Emergency Alert Data Delivery Apparatus and Methods" also filed Dec. 9, 2005 and incorporated herein by reference in its entirety.

Third Party Content Authority (CA)—

In another aspect of the invention, a third party content source database or other such data repository is used to determine whether a given subscriber or entity (which may be anonymous by virtue, e.g., identification or association of the subscriber's CPE/CD/PMD with the purchased content instead of their actual physical identity) has purchased particular content. For example, in one variant, the user registers with the content source such as during an on-line Internet purchase via the content source website. This information is maintained by the content source and, through agreement or cooperation between the MSO and the content source, provided to the MSO when the latter receives a "remote" request for content from one of its subscribers. Hence, the content server 242 at the headend or BSA hub can authenticate the user, and also access the content source database to determine if the content has been previously purchased by that user. A correlation table or similar data structure can be maintained by the content source, MSO, or combination thereof, which correlates the various devices under a subscriber's MSO account or otherwise associated with the subscriber. For example, in one variant, the content source maintains a correlation table containing the user's name (or alternatively identification information such as TUNER ID or MAC; see, e.g., co-pending U.S. patent application Ser. No. 11/186,452 entitled "Method and Apparatus for Boundary-Based Network Operation" filed Jul. 20, 2005 and incorporated herein by reference in its entirety), as well as network or other addresses (e.g., 32-bit IP address) for other devices associated with the subscriber's MSO account. In this fashion, a remote request being issued from a subscriber's PC, PMD or other such device that is not their CPE/CD at their premises can be immediately recognized and granted access to content that was purchased and downloaded to, e.g., the subscriber's CPE/CD, or was purchased on-line via a web account.

In another variant, two or more content sources (e.g., copyright holders) may create an accessible database ("Content Authority" or CA) for content purchases, somewhat akin to the centralized trusted authority (TA) architecture used for authentication and security purchases. The CA can then act as a local- or even national-level clearinghouse for remote content requests from MSO subscribers. This approach provides a substantially centralized point (or points) of access for network operators of varying types and configurations, so that they may process requests for content from "remote" locations or entities in a timely fashion, thereby also potentially relieving the MSO of having to store data and information relating to content purchases or downloads.

However, it will be appreciated that each MSO may desire to maintain such information for, e.g., backup, quicker service for in-network requests, and so forth. Accordingly, in another variant, the CA described above is used only in the case where the remote content request originates outside of a network or device reflected within the MSO database. For instance, one exemplary algorithm according to the invention accesses the MSO internal or local database (e.g., maintained at the headend 150) first to determine if a requesting device is reflected in that database. If the requesting device (as identified by, e.g., its MAC address, device ID, TUNER ID, etc.) is not present, then the algorithm calls out to the CA to see if the requesting device is present in the CA database. Conversely, the situation may occur where the requesting device is present in the MSO local database, yet the requested content is not reflected therein. Hence, since the subscriber may have purchased the content via a non-MSO linked source (e.g., an independent third party content source, such as via an Internet website), the algorithm may check the CA database (which would be updated with the third-party purchase of the content) to see if that content has been associated with that device (or subscriber).

The MSO database may also contain a correlation table or other such mechanism for correlating a specific subscriber's identity (e.g., name, SSN, address, etc. and their CPE/CD/PMD identifying data (e.g., TUNER ID, MAC, etc.), so as to permit cross-referencing within the third-party (e.g., non-MSO) databases. For example, such third-party databases may merely have the subscriber's name/address or other such information associated with a purchase of content. However, in order to associate a request from a CPE/CD/PMD that is rendered only in the device's identifying data, the MSO subscriber database must correlate the received device identifying data with a name, so that the third-party database can be cross-referenced.

It will be appreciated that the foregoing cross-referencing function can also be accomplished using an anonymous approach. For example, one exemplary embodiment of the invention comprises use of an "opaque" variable that is generated based on the user's device data via a cryptographic hash; see, e.g., the exemplary approach of U.S. patent application Ser. No. 11/186,452 previously referenced and incorporated herein. The hash and opaque variable frustrate de-encryption or reverse-engineering of the individual subscriber's identity or specific location. Accordingly, the association between the subscriber's actual identity and the content they have purchased can be maintained anonymous, thereby advantageously affording the subscriber total privacy as to their content purchases, yet still affording the ability to perform remote location access.

Similarly, a "two-way" hashing or anonymous association approach can be used, so that anonymity can be maintained within the CA or other third party database as well. This helps alleviate privacy concerns arising from the CA or third-party database. Specifically, in on embodiment, the user's content purchase information can be maintained using a similar yet independent opaque variable or other such mechanism generated by the CA/third-party source. For example, the user's IP address and a device ID (or other information uniquely identifying the user's platform or the user themselves, such as SSN, credit card number, etc.) can be used to generate a cryptographic hash and resulting opaque variable that is correlated to the purchased content. Hence, when an MSO subscriber purchases content via whatever channel outside the MSO network, a unique opaque variable is established and correlated to the content purchased. This second opaque variable can then be forwarded to the MSO, who can add this to a correlation table or other data structure, such as the table in which the MSO's (local) opaque variable is stored. Hence, a correlation between the first (local) and second (third party) opaque variables is established, thereby allowing for end-to-end anonymity for the subscriber/purchaser. The correlation between the two opaque variables can be established by, e.g., a physically and virtually secure database that is discrete from those previously described and which is populated through use of information that definitively correlates the two opaque variables in at least one aspect (e.g., name and SSN/CCN). Hence, surreptitious theft or "hacking" into this secure database by itself would not allow correlation between an individual and their content choices, since it only contains a data structure relating one or more MSO opaque variables to one or more third-party or CA opaque variables. Hence, three different databases are use in the exemplary architecture (and required to correlate an individual to particular content purchases): (i) an MSO local database that correlates the subscriber's unique MSO local opaque variable(s) to that subscriber; (ii) a third-party or CA database that correlates a content purchase to a second opaque variable (e.g., hash generated by way of the user's personal information, etc.); and (iii) a third database that correlates the first and second opaque variables (or sets thereof).

So, as an example of the foregoing, subscriber A (John Smith) first purchases "Pirates of the Caribbean" via third-party website B, which takes the subscriber's CCN or SSN and produces an opaque variable V based on a hash, the variable which is then stored as an entry associated with "Pirates of the Caribbean". Hence, anyone gaining surreptitious access to this database would merely have a group of opaque variables correlated with various specific content.

Stored at the MSO headend, or other designated location is a second database which correlates the subscriber's devices with their identity; e.g., John Smith located at 742 Evergreen Terrace has devices P, Q, and R associated with his subscriber account (the devices being identified by opaque variables S, T, and U respectively unique to that subscriber and to each device).

Next, John Smith travels to Paris on vacation, and wishes to access the movie he purchased via the Internet website B previously discussed. Hence, he issues a request using his laptop, which is sent to the cable network headend via an Internet connection. The opaque variable T is generated for John's laptop, which is associated with John's account as previously noted. However, the laptop opaque variable is merely used to enter the third database; i.e., the opaque variable correlation table, to correlate variable T (laptop) to variable V (purchase of ""Pirates of the Caribbean"" via internet website B). The access to the third database can be conducted on a per-variable basis; i.e., simply search for variable T and return all corresponding "content" variables (e.g., V), and match the returned variable(s) against the current content request. Hence, an "end-to-end opaque" transaction is supported, and anyone gaining access to only one (or even two) of the three aforementioned databases could not affirmatively correlate an individual's identity to particular content purchases, since the opaque variable in the third-party or CA database is not the same as that in the MSO database. This "distributed" approach of dividing the information necessary to correlate purchases to individuals provides enhanced security, since different security measures are employed at the CA/third party as compared to those at the MSO, and hence multiple systems must be "hacked" or breached.

It will be appreciated that in the context of the invention, the term "subscriber" or "user" can refer to more than one entity, such as for example a group of related family members, co-workers at an enterprise, etc. In one variant, a "virtual site license" approach is used, wherein the members of a logically related group (e.g., family members) are given copyright license to purchased content for unlimited personal use, such as for an additional fee. Hence, a set of device ID's (e.g., MAC, TUNER ID, IP address, etc.) for all of the devices in a family can be maintained in the aforementioned database (s), and each member given unlimited remote or local network access. The term "virtual" refers to the fact that the devices of the various members may be mobile, and hence the license is associated with a device rather than a fixed location or premises (although it clearly can be used at a fixed location or premises as well).

Method of Establishing Remote Access—

Figure 3:
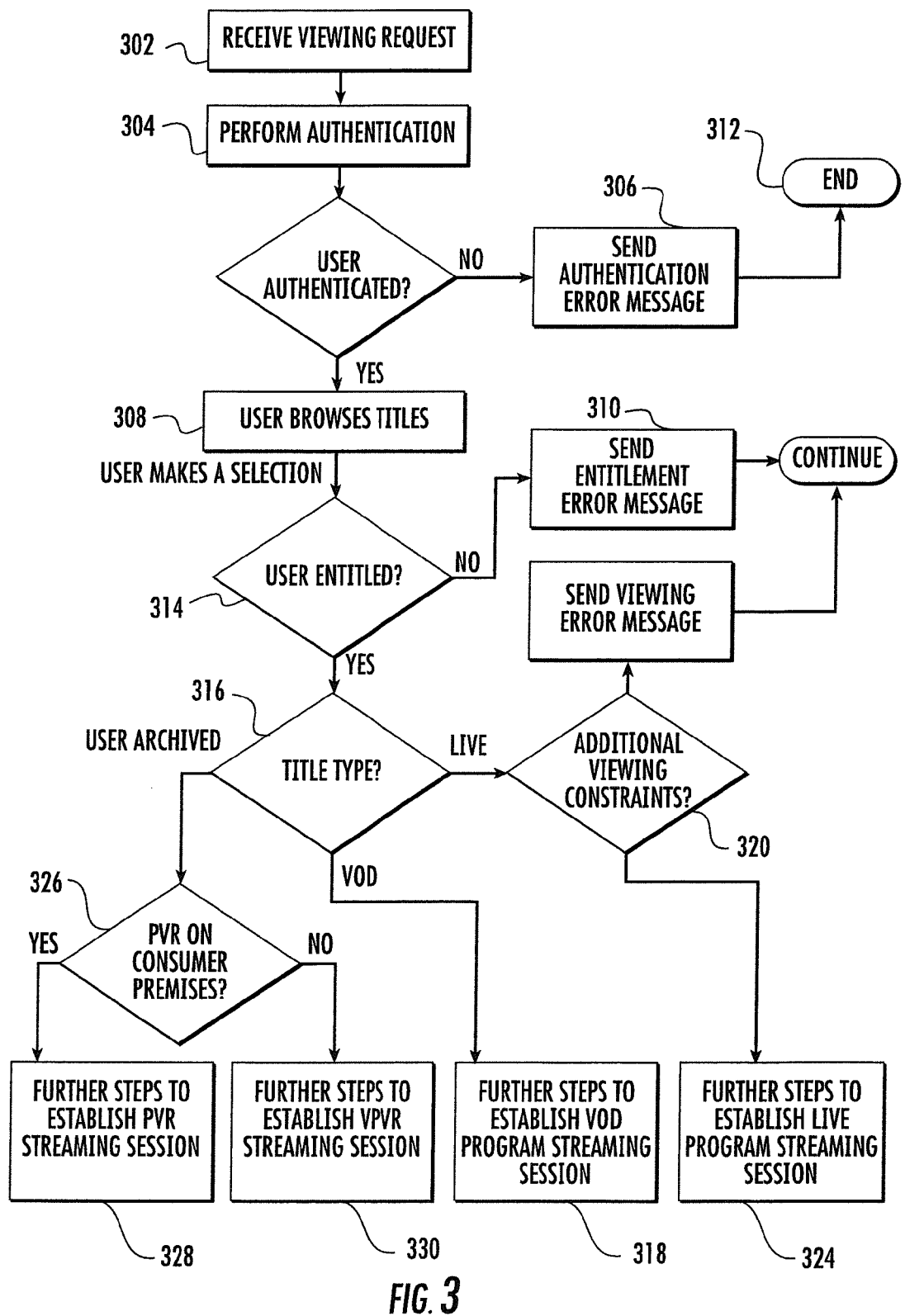
FIG. 3 is a logical flow chart illustrating one exemplary embodiment of the method of establishing a content delivery session according to the present invention.

FIG. 3 shows one exemplary embodiment of the methodology of establishing remote personal content access according to the invention. Such access may be requested when a subscriber is located in a visited or remote network 204 (which may or may not be physically remote to the subscriber's local network 202), and wants to access content available on his local network. This request may be communicated to the local network by a message (step 302) or other direct or indirect communication to the server entity 210, indicating the remote user's wish to access "local" content (e.g., watch a program available for distribution over the local network). For example, in one implementation, the interaction may be in the form of a web-based interactive application running on the server 210, with the remote client device (RCD) 214 being equipped with an application that has the knowledge of a network address to contact the interactive application. The server and client applications may also comprise a distributed application (DA) having server and client portions disposed on the respective devices.

In one embodiment, the client application allows the subscriber to browse (via, e.g., a user interface such as a browser) and select content for delivery from a listing of available titles, with availability of the titles for delivery to the remote device being determined according to one or more criteria described subsequently herein.

In another exemplary implementation, the subscriber may navigate to a universal resource locator (URL) for access to the server hosting the server side component of the personal content distribution DA.

When the viewing request is received at the server entity 210 (e.g., cable network headend server), an authentication of the request and its origin is performed (step 304) to ensure that the request has come from a user using an RCD 214 that can be served. Such authentication may rely on a variety of methods, including, but not limited to, user identification by password and User ID, known device address, use of digital certificates, public/private keying and other well known cryptographic techniques.

If the server entity 210 determines that the request is not authentic per step 304, an authentication error message is sent to the requesting application (step 306) and the session is terminated (step 312). Such an error message could provide the user explanatory information as to why their request was not successful, an opportunity to re-send the request, and/or contain promotional messages such as a subscription or purchase web page URL. If the user request is authenticated, an interactive session is established (308) in which, among other things, the user is provided with a menu of tasks he can perform and content genre/titles available to him.

When the user makes a selection to access a particular content element (e.g., movie or TV program), an inquiry is made per step 314 to determine if the user's subscription or other access privileges allows him to watch the desired program. If the user is not entitled to watch the program, an appropriate error message is sent (step 310) and the interactive session continues where viewer is given choice to select something different per step 332. Alternatively, the user can merely be presented with a pre-screened listing of available content, such as where only those titles which the user has previously purchased or downloaded to their DVR are presented for selection. Myriad other schemes for presenting the remote user with choices for selection will be recognized by those of ordinary skill when provided the present disclosure, and accordingly are not described further herein.

When the viewer is found to be entitled to access the particular title, a determination is made about the type of title desired (step 316). In the exemplary embodiment relating to media (e.g., video services), three types of titles are generally made available to a user: (i) live or broadcast television, (ii) VOD material available in the local network; and (iii) user programs, either existing on the subscriber's DVR (or networked or virtual DVR, or some such arrangement). It will be appreciated, however, that the invention is in no way limited to media or video-related content, and remote access accordingly can be extended to a number of other different forms of content including without limitation audio content (e.g., music CD's, individual MP3 or comparable files, etc.), gaming or simulation content, software applications, and even stored data (e.g., archived data stored at the headend or another designated storage location, such as part of a "virtual RAID" service for the subscriber).

If the content desired by the user is a live or broadcast program (or other substantially real-time content delivery modality), the personal content server 242 may check for additional constraints (step 320) that might limit the delivery. These checks may include, e.g., determining the geographic location of the user, and whether the selected content can be delivered to that location at that specific time, such as due to blackouts or other such restrictions. For example, professional sports organizations routinely use blackouts. Such a blackout can be enforced by obtaining information about the subscriber's location from the remote network.

Once the server has ensured that the program viewing request can be fulfilled, further steps to set up the content delivery session are undertaken (step 324). These steps are generally consistent with conventional content delivery techniques, and accordingly not described further herein. The content manager 238 may also select an appropriate origination point from within the local network (or a proxy) for delivering the content to the subscriber. The choice may depend on several factors, including for example location of any remote network gateways or nodes with respect to available content servers 242 in the network.

If the content desired by the user is a title available on the VOD servers of the delivery network, the CM 238 will hand off the streaming session to an appropriate VOD server (step 318). As a result, a VOD delivery session will be instantiated, and the content delivered via the session to the requesting RCD.

If the content desired by the user is a title present on his DVR (step 326), multiple scenarios are possible, including: (i) the DVR is present in the subscriber's premises, or (ii) the DVR is on the network side in the form of a virtual DVR (VDVR) or a network DVR (NDVR). So as to avoid use of upstream bandwidth, if the selected title is present on the premises DVR, a third party content source is accessed to locate and provide the requested content, as opposed to retrieving the content from the premises DVR. Alternatively, if the requested content is already present on the network in the form of a NDVR/VDVR copy, then a call is made to the relevant storage function to obtain the requested content.

When the local network contains a DVR or similar recording device, additional signal exchanges may take place between the content manager 238, and the local/remote devices in order to authenticate, validate, and/or synchronize remote viewing. For example, content providers are concerned about copyright issues associated with recording and storing high value content in unprotected physical devices and formats. Such concerns may be addressed by the present invention by synchronizing or correlating the content stored by the subscriber on the home DVR or other such device; if the content desired to be accessed from the visited or remote location is present on the home DVR, then the remote user will be allowed access. If no correlation exists, then remote access is denied. This approach carries advantages relating to copyright protection and management as well; in simple terms, since the subscriber already has a copy on their DVR, allowing that same subscriber to view the same content except in a remote location is no different than if that subscriber had merely brought their DVR with them to the remote location.

In another embodiment of the invention, the remote content delivery functionality previously described is predicated upon what the subscriber's premises device (e.g., CPE 106 or CD) is presently tuned to, or will be tuned to (such as via an advance reservation or channel tuning selection on an EPG or the like). This information can readily be obtained from the headend 150 or BSA hub infrastructure, and passed to the content server 242 tasked with serving the remote content request from the RCD. In this fashion, the subscriber makes an affirmative selection of the content that they wish to have delivered to them, and the remote content delivery mechanisms of the invention act as a "repeater" only; i.e., they are coupled to the subscriber's premises tuning activities. Stated differently, the subscriber can be selectively blocked from remotely accessing content that is not presently selected for viewing or recording by a premises device. This approach has advantages from, inter alia, a copyright standpoint, since there is direct coupling between what the subscriber is tuned to at their premises and what they are receiving remotely. Hence, the "time shifting" and "space shifting" paradigms are preserved; the subscriber is merely displacing their viewing location for the content, as if they merely had a very long "wire" from their premises to the remote location.

The foregoing approach also enables a "watch-along" function; i.e., by allowing remote delivery of content that is also contemporaneously being delivered over a channel to which subscriber's LCD 208 is tuned, family or other logically related groups can be serviced in effectively identical fashion. Hence, a parent away on a business trip can be apprised of what his/her children are watching at home with the aforementioned watch-along or repeater function. VoIP or similar audio/video communications (e.g., webcam) between the RCD and LCD domains may also be provided, such as to provide conversational capability between the parent and the family members while all are watching the content, so that all participants feel proximate to one another.

Similarly, the RCD can be configured to communicate with the CM 238 (or even the LCD 208 directly) to enable/disable certain functions or tuning capabilities. For example, the RCD can instruct the CM 238 to disable serving VOD or broadcast content associated with more adult or mature channels to the LCD during certain time periods.

In another embodiment of the invention, the recording of content at the headend 150, BSA hub site or other MSO node is controlled based on subscriber selections. For example, in one variant, the subscriber must affirmatively select content for recording via their DVR/NDVR/VDVR before it can be delivered to the RCD. In this manner, the user has affirmatively selected content for recording, and hence the MSO or other entity tasked with recording the content (if necessary) for delivery to the RCD is in effect simply acting as a remote recorder for the subscriber. In the case where the user has recorded content within an NDVR or VDVR environment, that same copy or recorded content can be used as the basis or source of the content used to service the remote delivery request if desired, thereby causing the MSO or other content recording entity to make only a single copy of the content.

It will be appreciated that the subscriber tuning and the recording actions described above can be invoked remotely if desired as well as locally. Hence, a given subscriber might remotely transmit a "tune" command from their RCD or another device (e.g., via a packetized communication delivered over an in-band-channel, OOB, DOCSIS channel, telephony or other link) to tune their LCD to a given program channel, or invoke a DVR record function, thereby enabling the aforementioned delivery of the same content to the remote location.

Cached Reservation Information—

In another embodiment of the invention, reservation or other such information (e.g., that used to for example reserve or cause later switching of a CPE 106 or other such device to a given program channel or VOD stream) is configured on the subscriber's LCD (e.g., DSTB) at their premises and then asset information (e.g., the unique asset ID for the reserved program or programs) is cached back to a centralized server or other data structure remote from the subscriber's premises. Advantageously, this approach allows a subscriber or other entity to access reservation or similar information anywhere via an internet (e.g., the Internet) or other network without having to connect to the premises system.

Figure 3A:
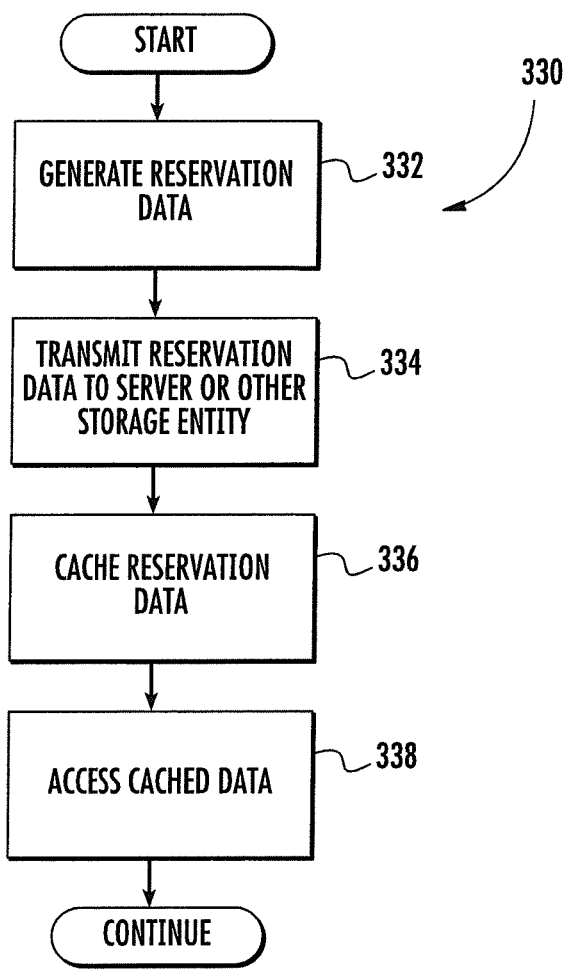
FIG. 3*a* is a logical flow chart illustrating one exemplary embodiment of the method of remotely caching reservation information for a content delivery session according to the present invention.

FIG. 3a illustrates one exemplary embodiment of the method 330 of providing remote reservation information caching. It will be appreciated that the term "remote" as used in this particular context means any location (whether actual or virtual) that is not the subscriber's premises LCD or CD (discussed subsequently herein with respect to FIG. 6). For example, a remote cache might be disposed at the headend 150, a BSA switching node (see FIG. 1c), a mobile device (e.g., the subscriber's laptop computer, PDA, or cellular telephone), mobile or portable storage device (e.g., USB key), a web server, etc. In one aspect, the present invention seeks to avoid having the subscriber or the network operator traverse the network back to the subscriber's LCD to obtain the reservation or similar information. Hence, literally any device that can be used to cache data that is remote from or more favorably disposed may be used as the cache.

As shown in FIG. 3a, the method 330 comprises first establishing reservation or similar information with respect to a network user or subscriber (step 332). This might comprise, for example, the subscriber selecting one or more programs to reserve via the EPG on their premises LCD (e.g., DSTB). This information can be locally stored, and/or immediately transferred upstream as discussed below with respect to step 334.

Next, the reservation information is transmitted to the designated caching device, such as the aforementioned content server (CS) 242, per step 334. This transmission may be in the clear, or optionally integrity/confidentiality-protected, such as via public key or symmetric encryption if desired pursuant to e.g., a VPN architecture or the like, such as where the information is traversing an entrusted network (e.g., the Internet). As previously discussed, the reservation information sent upstream (or to a remote cache location) may also be anonymously associated with the subscriber or their LCD, such as by using an opaque variable (e.g., one way hash derived from inter alia MAC, TUNER ID, etc.). In this fashion, surreptitious access to the cache where the reservation information is stored will yield no useful information regarding specific subscriber's activities or choices, thereby maintaining complete privacy for the subscriber.

In one embodiment, the reservation information is transmitted upstream (e.g., via DOCSIS or 008 channel) to the headend 150, wherein the CS 242 (or another such entity) stores the reservation information. Reservation information as used herein may comprise literally any type of information, data, or metadata that may be related to or associated with a program, service, or content; see, e.g., the exemplary embodiments and discussion set forth in co-owned and co-pending U.S. patent application Ser. No. 10/263,015 filed Oct. 2, 2002 and entitled "Network based digital information and entertainment storage and delivery system", now published as U.S. Patent Application Publication No. 20030208767, which claims priority under 35 U.S.C. 119(e) the benefit of U.S. Provisional Application No. 60/377,963 filed on May 3, 2002, each of the foregoing incorporated herein by reference in its entirety.

In another embodiment, the reservation is transmitted to a remote server (e.g., web server) via the DOCSIS upstream or OOB channel. The web server maintains the reservation information for the subscriber, with persistence at least to the prescribed date and time associated with the reservation.

In yet another embodiment, the subscriber's LCD is configured so as to format and store the reservation information as a data file or other structure on a portable storage device (e.g., USB key plugged into a USB port on the LCD). The subscriber then simply takes the media with them when they roam, and plugs the media (with reservation data file) into the USB or comparable port on their laptop or PMD, whereby the PCS and other infrastructure can access it when the laptop or PMD is started and placed in communication therewith.

It will also be appreciated that transmission of the reservation information need not occur (i) immediately, or (ii) in one discrete transmission. For example, in one variant, the reservation information is transmitted opportunistically; e.g., such as when a desired condition or set of conditions exist. One such condition might comprise no or little upstream bandwidth contention. Another might comprise both the LCD and the CS 242 (or other caching device; e.g., web server) being powered up, operation, and able to establish communication with one another. Yet another might comprise the completion of provisioning of the CS 242 or other infrastructure by the MSO (e.g., establishing a storage location on the CS for the reservation information, after verification of the subscriber's account status, privileges, etc.), and/or pursuant to a "request/grant" mechanism of the type well known in the art.

Similarly, the LCD may be programmed to aggregate reservation or similar information for a prescribed period of time, so as to avoid multiple upstream transmissions.

Conversely, the LCD may be programmed so as to send the reservation data as soon as it becomes available; i.e., a number of small pieces versus one aggregated quantity of data taken over a more extended period of time. The data may also be compressed or otherwise processed as desired (e.g., encryption or opaque variable generation/tagging as previously described).

Next, per step 336, the transmitted reservation information is stored or cached on the target device (e.g., CS 242), and uniquely associated with the subscriber. It will be appreciated that such unique association may be on a per-account, per-device, or per-user basis, or otherwise as desired. For example, in one variant, the reservation information comprises a hierarchy comprising: (i) an account tier (which may subsume multiple users, devices, and even locations); (ii) a device tier (which may subsume multiple users and locations); and (iii) a user tier (which may subsume multiple users). As an illustration, consider Account No. 123456, which has associated with it five users (all five members of the Smith family), and which has three (3) devices associated; e.g., DSTB 1, DSTB2, and DSTB3, with DSTB 1 and 2 at a first premises, and DSTB 3 at a second premises. So, when Jane Smith enters reservation information into DSTB 3 via the second premises, the exemplary embodiment of the hierarchy records this level of granularity, and stores it in the cache accordingly. Hence, when Jane subsequently connects to the CS 242 while on the road with her laptop, she can either enter identifying information (e.g., select from a menu of users, locations, etc. associated with her master account), or have the CS 242 automatically recognize her such as via a pre-established device address (e.g., the MAC address on her NIC in her laptop), higher-layer process identification, user-specific SIM card (akin to GSM and UMTS phones), and so forth. Any number of different mechanisms useful for automatically identifying a computer and/or associated user will be recognized by those of ordinary skill given the present disclosure. Accordingly, Jane's unique reservation information will be retrieved and utilized by the CS 242.

Alternatively, the reservation information can be segregated merely by location; i.e., that associated with DSTBs 1 and 2 for the first location, and DSTB 3 for the second location.

At the highest level, all reservation information for the entire account can be stored and accessed remotely, such as where parents may want to see what their children have reserved while the former are away on the road.

Myriad other hierarchical or other organizational schemes for unique reservation information will be appreciated by those of ordinary skill given the present disclosure.

In addition, the transmission of reservation information may be mirrored by data maintained on the LCS or CPE 106. So, for example, when a subscriber is on the road during a given period, they can access the reservation information remotely (i.e., from the server), as well as from their premises when they return, without the two conflicting. Moreover, the two systems can be programmed to be duplicative; e.g., the reservation information may be utilized remotely (e.g., the traveling subscriber being switched to their reserved broadcast) and locally (e.g., the DSTB in their premises switched to the same reserved program) such as by another family member. Hence, multiple different operating modes are envisaged, including for example: (i) "exclusive" mode, wherein only one location (e.g., remote or local node) acts as a master to which the reservation information is limited; (ii) "non-exclusive/coupled" mode, wherein the remote and location station(s) act effectively as repeaters of one another; and (iii) "non-exclusive/decoupled" mode, wherein the remote and location station(s) act independently of one another with respect to reservation or similar information.

In still another embodiment, the reservation or other data remotely provided (e.g., by an RCD user on the road) can be transmitted back up to the CS 242 or other serving entity, or even a network proxy (e.g., web server, another MSO server, etc.) for distribution. Such distribution may include for example sending all or part of the reservation data back to the LCD (e.g., CD or STB) of the remote user, thereby allowing for remote updating of their premises device. In one variant, a reservation manager client application is used on the LCD or CD to manage data received remotely (e.g., from the CS server 242, or even directly from the RCD via for example an IP transport mode such as a downstream DOCSIS channel), as well as reservation data generated locally at the LCD (such as via user input via an on-screen display or the like).

In addition to storage at the CS 242, the present invention further contemplates the CS or other entity acting as a proxy for storage; e.g., the received reservation or other data being stored on a designated storage node that may or may not be related to the CS 242. For example, in one variant, the CS designates one or more Internet web servers to receive the data for storage.

Lastly, per step 338, the cached information is accessed as previously described. Typically, this will be by the remote device, (RCD) or its proxy; however, the present invention also contemplates the case where the LCD (e.g., premises DSTB) may require access to this remotely cached data as well. For example, where the LCD is not equipped to store the level of detail or granularity of hierarchy previously described (e.g., it is only capable of knowing or storing data indicating that someone reserved a program, but not who in particular), the use of remotely cached data can afford this additional layer of capability. This also obviates having to retrofit more capable CPE or software; the reservation management tasks are wholly or at least partially pushed off to the remote caching entity (e.g., CS 242) or its proxy.

Moreover, the reservation information may be useful for the MSO or other entities for purposes of, e.g., historical data analysis or demand/bandwidth prediction algorithms, such as for instance those described in co-owned and co-pending U.S. patent application Ser. No. 11/243,720 filed Oct. 4, 2005 entitled "SELF-MONITORING AND OPTIMIZING NETWORK APPARATUS AND METHODS", which is incorporated herein by reference in its entirety. In one such variant, the subscriber's reservation information is used (whether anonymously, such as via the aforementioned opaque variable, or otherwise) alone or in conjunction with that of other subscribers so as to e.g., predict bandwidth consumption in the future. By having this information cached on a headend or other server, the MSO has yet additional information with which to "shape" bandwidth allocation over the network as a function of time.

Similarly, if the remote caching of reservation information is done selectively; e.g., only when the user knows that they will not be home, the MSO can use this information to allocate bandwidth in the network; i.e., by knowing that the user will not be consuming the bandwidth associated with the reserved programming in their premises network, but rather via a remote network.

It will also be appreciated that the RCD and serving entity (e.g., CS 242) of the present invention may also be configured to permit the remote user to utilize an EPG or similar application to reserve content remotely. This might be done, for example, using the exemplary virtual interface emulation described subsequently herein, although other approaches may be used as well.

Virtual CPE—

In yet another aspect of the invention, a "virtual CPE" functionality is provided, wherein the user of the RCD is presented with a virtual CPE (e.g., STB and/or remote control) interface to mimic the controls and "look and feel" of their premises CPE (e.g., DSTB, "sling" apparatus, converged device (CD), etc.). As previously described, prior art approaches to remote content delivery such as the Slingbox suffers from several disabilities, including the fact that the indigenous user interface and controls of the platform receiving the content at the remote location must be used. For example, where the user's RCD comprises a laptop computer with. Windows Media Player or Real video codec, the control functions presented to the user are effectively limited to those of the indigenous codec.

Figure 3B:
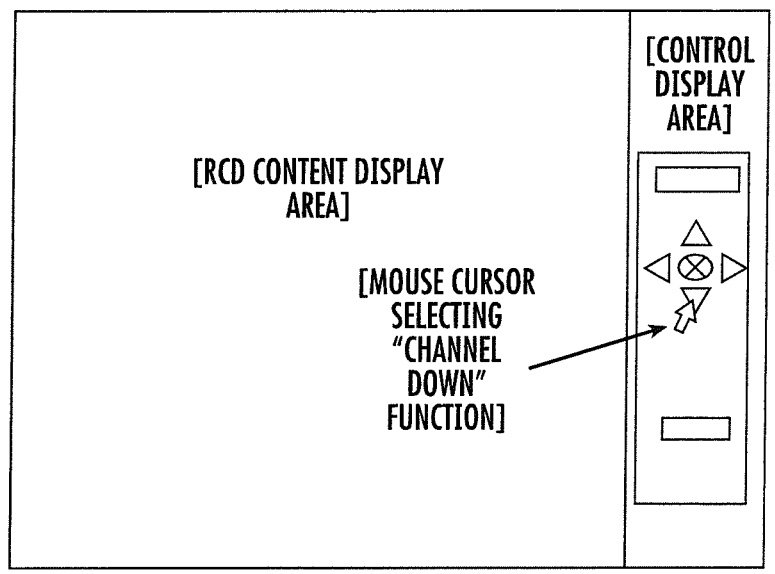
FIG. 3*b* is a graphical representation of one embodiment of an emulated hardware interface useful with a remote content rendering device according to the present invention.

In one variant of the present invention, a client application disposed on the RCD is operative to instantiate a GUI that emulates the appearance, sounds, and functionality of all or a portion of their parent LCD or CPE; e.g., a virtual STB or DVR with remote. In one embodiment, the instantiated GUI comprises a graphical image or other representation of a hand-held remote control unit (see FIG. 3b), including buttons, sliders, etc. The portions of the generated image correlating to a fast-forward (FF) button, for example, is made user-interactive such that a mouse cursor and click, or even finger touch on touch-screen displays of the type well known in the art, will cause a software operation to be invoked, which will transmit a command back to the serving entity (e.g., the CS 242, VOD server, etc.) over the interposed network.

In one such variant, the command message is encapsulated in the well-known TCP/IP protocol and delivered over an IP-based network such as the Internet to the serving entity.

In another variant, the command is proxied by the actual LCD device being emulated; e.g., the DSTB, Slingbox, DVR or CD. It will be recognized that using this approach, only command messages or signaling is transmitted from the remote to the LCD (e.g., via IP and DOCSIS downstream, in-band downstream, etc.), and not the actual content requested or delivered, the latter which comes directly from the CS 242 or other serving entity. Reasons for using the actual premises device as a command/signaling proxy include for example ensuring that certain policies, procedures or other restrictions are applied or enforced. Consider the case where the remote user comprises a child of parents who are not available to supervise the child's content selections or access. If no "remote" content exclusion or masking policies (e.g., no adult content) are not enforced on the child's RCD, the RCD could conceivably pull the masked or excluded content from the serving entity without the parents having knowledge. However, by routing all command and signaling through the premises environment, the indigenous premises policies may advantageously be enforced on all remote requests.

On-screen emulation of hardware or other interfaces is well known in the art, and accordingly not described further herein. It will be recognized, however, that any number of audible, visual, and even tactile interfaces can be emulated using such techniques. Other behavioral or anecdotal features can also be emulated, such as e.g., clicking sounds when a button is pressed, delays in activation that emulate actual delays, alarms, warning lights, etc.

The foregoing emulation may also include controls and on-screen displays that are created when the device being emulated is actually used. For instance, in one variant, the RCD is programmed to generate an EPG or Watch-TV application display effectively identical to that the user would encounter at their premises. The remote control emulation might be placed immediately next to the EPG, etc. on the screen, whereby the user can click the "Select" button on the emulated remote via the mouse of their laptop for example, and the associated EPG feature (e.g., illuminating a selected entry) is performed.

It will be appreciated that the GUI or screen emulation described above can be scaled, sized or otherwise configured for a variety of different platforms. For example, in the case where available screen size is limited (e.g., the received content is received over a small device such as a handheld, PDA or even smartphone, and then played out to a larger display device such as a monitor or television), the user may wish to use the small device as a remote. Hence, the GUI emulation can be scaled and optimized for the small screen, including e.g., changing button sizes, eliminating high-density or high-overhead display items or features, etc. The user can then use the PDS, phone, etc. as a remote control, e.g., via the indigenous interface on that device to invoke functions on the GUI remote control emulation generated on that same device.

In yet another embodiment, the interface emulation comprises (either alone or with the aforementioned remote control emulation) a graphical display or representation of the front panel of the device; e.g., STB, Slingbox, CD, etc. This may be useful for accessing functions that are normally accessed via the front panel, and/or viewing front panel indications that might not otherwise be viewable. These indications can be generated locally at the RCD based on information sent from the CS 242 or other serving entity, and/or from a proxy which may even include the device being emulated itself. The latter case is primarily useful where the remote user wishes to know the actual status or condition of their hardware device installed at their premises. For example, where a "hardware failure" warning light or the like has been illuminated on the premises device, the device could be configured to format and send a message (e.g., via upstream TCP/IP channel) to the remote device or a serving entity therefore. This message, when delivered, could cause the on-screen emulation to reflect a similar condition.

The front panel and remote emulations can be displayed in side-by-side fashion, as alternates to one another (e.g., toggled by keyboard command), or according to any number of other schemes that will be recognized by those of ordinary skill.

In addition to a virtual or emulated GUI or other such interface, the present further contemplates the use of an application with a hardware interface to an actual device (i.e., hardware and software emulation of a hardware function). See FIG. 3c. For example, in one such embodiment, the user actually brings their premises remote control (or a copy thereof) with them, which is then used to interface with a corresponding hardware (e.g., IR, RF, etc.) interface on or coupled to the RCD.

In one variant, the user merely plugs a small receptor (akin to that actually built into VCRs, DVRs, DSTBs, televisions, etc.) into their USB, PCMCIA, Firewire (IEEE-1394), or other port or interface on the LCD, and points the remote at the receptor during use. A client utility or application resident on the RCD receives the signals from the receptor, emulates or generates the desired command in software; and encapsulates the command into e.g., TCP/IP packets that are then sent over the RCD's physical layer (e.g., WiFi STA-AP interface, Ethernet connection, etc.) to the serving entity or proxy for execution. For example, one embodiment for a VOD or trick mode function might comprise a LSCP (lightweight stream control protocol) command or the like.

Figure 3C:
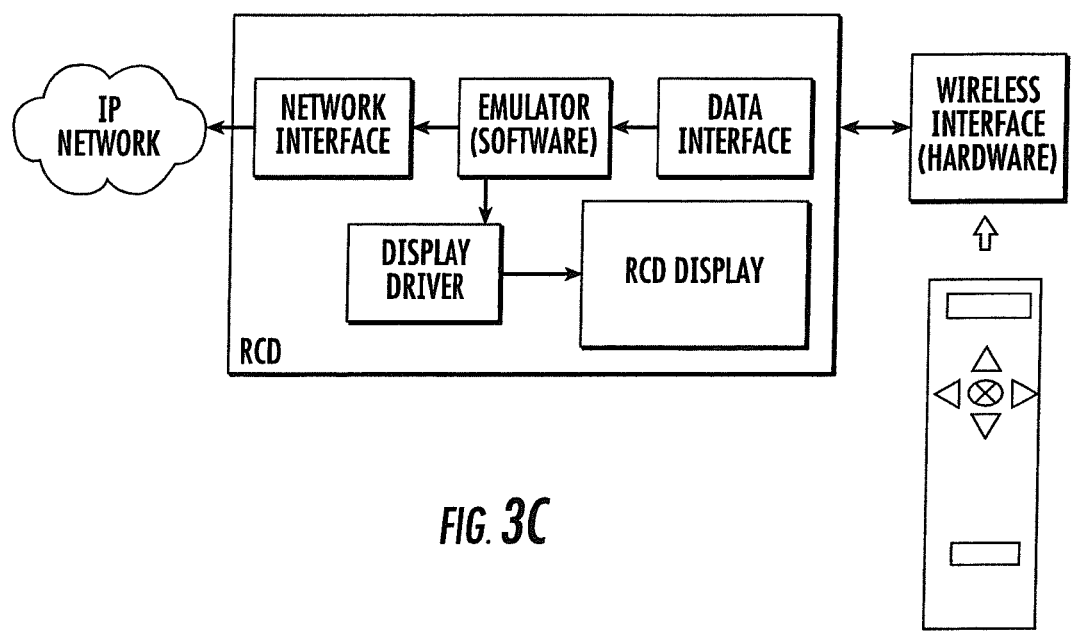
FIG. 3*c* is a functional block diagram illustrating an exemplary embodiment of a hardware/software emulation of a hardware apparatus according to the invention.

The device is also configured with a display driver which is responsive to the generated commands, and which can display an on-screen icon or text indicating the selected mode (e.g., two head-to-tail arrowheads for fast forward, the text "PLAY" for play mode, etc.) as shown in FIG. 3c.

Hence, the emulation features described herein would provide for a substantially transparent user experience; i.e., the viewer's content navigation and delivery experience, whether remote or at their premises, would be substantially identical.

This also affords the user the ability to access features that either: (i) might not otherwise be supported by the underlying codec environment (e.g., network- or MSO-specific features), or (ii) are difficult or ungainly to utilize in a different user interface environment such as that of a laptop computer. For example, in order to invoke a certain feature, the user might have to use some arcane combination or sequence of key strokes which they might not easily remember (e.g., ALT F11 or the like). Under the emulation approach of the present embodiment, the remote user can switch channels, invoke VOD or "trick mode" control, change user settings, etc. via the same familiar interface that is used from their premises (e.g., home or business). The user therefore need only remember how to use their premises device.

Network Server—

Figure 4:
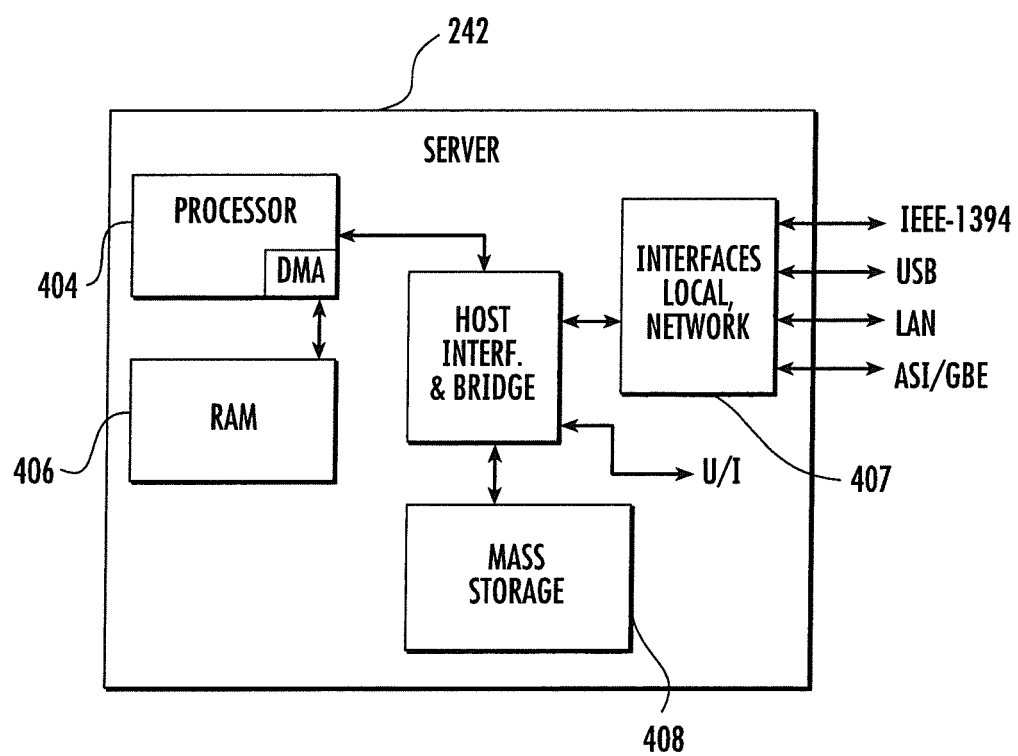
FIG. 4 is a functional block diagram illustrating an exemplary embodiment of a network server apparatus according to the invention.

Referring now to FIG. 4, one embodiment of the improved network content server device 242 adapted for remote content delivery according to the present invention is described. As shown in FIG. 4, the device 242 generally comprises a network server module adapted for interface with the remote network 204 of FIG. 2, digital processor(s) 404, storage device 406 (and optional mass storage device 408), and a plurality of interfaces 407 for use with other network apparatus such as LANs, routers, and other packet network devices, network management and provisioning systems, local PCs, etc. Other components which may be utilized within the server device 401 include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SIP, LSCP, etc.) may also be provided as required. Where the content server is also acting in a local network capacity (e.g., as a VOD or application server), an appropriate application is also disposed to run on the server module 401 to provide a functional interface for e.g., VOD session requests received from the LCD or other interposed entities. These additional components and functionalities are well known to those of ordinary skill in the cable and embedded system fields, and accordingly not described further herein.

As previously discussed, the server device 401 also may run the server portion 252 of the content management DA.

The server device 242 of FIG. 4 may take any number of physical forms, comprising for example one of a plurality of discrete modules or cards within a larger network headend or edge device of the type well known in the art. The server may also comprise firmware, either alone or in combination with other hardware/software components such as those previously described (e.g., disposed in the aforementioned edge device). Alternatively, the server module 401 may be a stand-alone device disposed at the headend or other location (such as a VOD server 105 or application server 104), and may even include its own RF front end (e.g., modulators, encryptors, etc.) or optical interface so as to interface directly with various portions of the HFC network 101 if desired. Numerous other configurations may be used. The server device 242 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, any required conditioning of the content before delivery (such as the inclusion of watermarking or other data, encryption, generation of encryption key pairs and/or challenges, and so forth) may take the form of one or more computer programs running on a single device disposed within the network (e.g., the content server 242 of FIG. 2a), such as at a headend, node, or hub.

As yet another example, portions of the content distribution functionality may be rendered as a dedicated or application specific IC (ASIC) or DSP having code running thereon. For example, a security processor of the type well known in the art can be used to implement encryption algorithms on the delivered content, and/or to perform key pair generation and the like. Myriad different configurations for practicing the invention will be recognized by those of ordinary skill in the network arts provided the present disclosure.

The server operation can also be masked or controlled by a "business rules" engine or other logical wrapper or layer as described subsequently herein.

Local Client Device—

Figure 5:
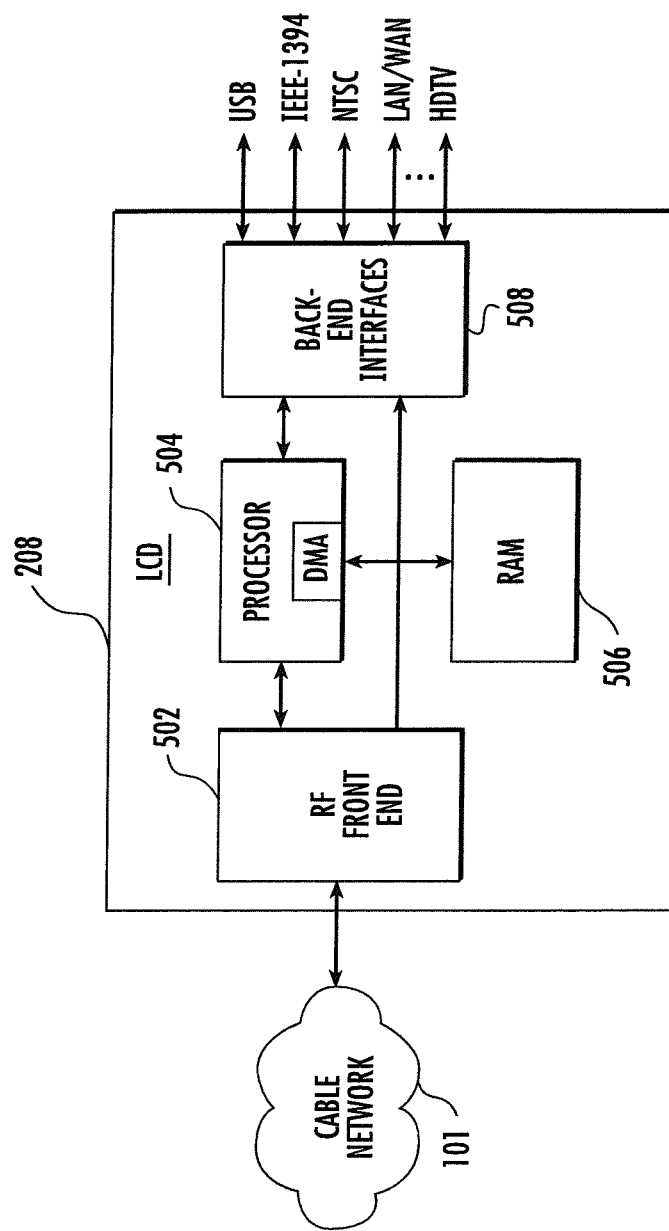
FIG. 5 is a functional block diagram illustrating a first embodiment of a local client device (LCD) generally useful with the invention.
Figure 6:
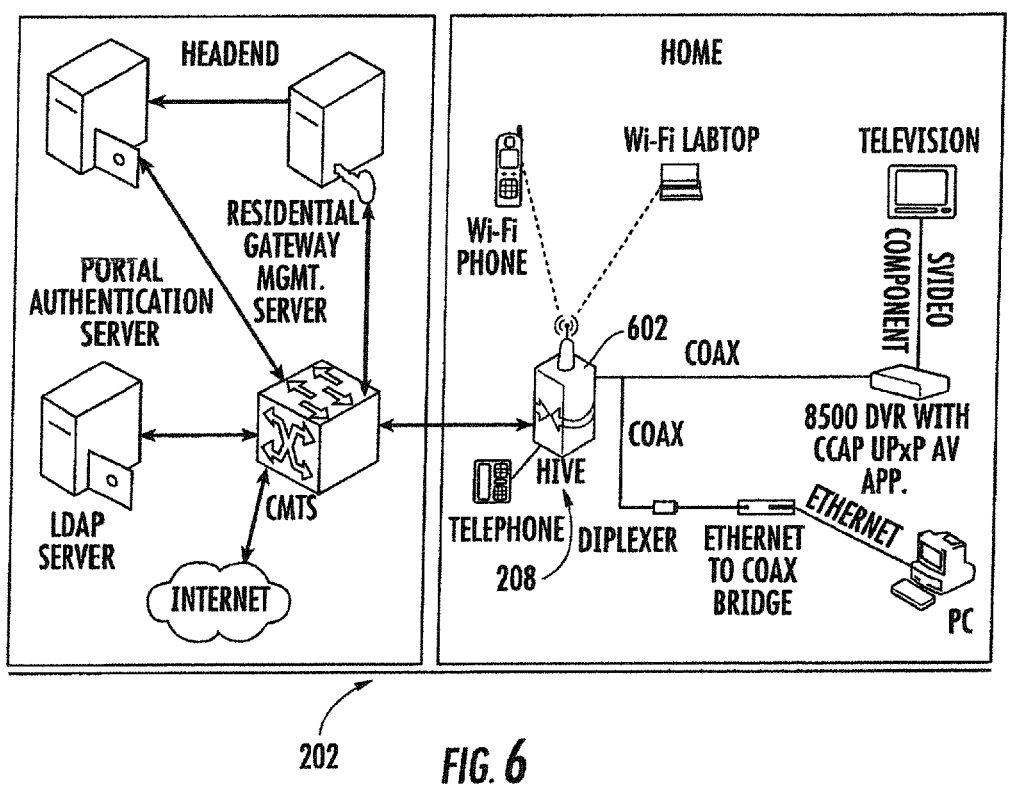
FIG. 6 is a functional block diagram illustrating a first embodiment of a local client device (LCD) generally useful with the invention.

Referring now to FIGS. 5 and 6, exemplary embodiments of the Local Client Devices (LCDs) according to the invention are described.

In the case of HFC or satellite networks, the LCD 208 in one embodiment comprises a CPE in the form of a set-top box with a tuner stage or front end adapted for interface with the relevant physical medium (e.g., connected to the coaxial cable, or a satellite antenna). The LCD 208 may or may not include DVR/PVR functionality. Also, the LCD may not be a physically separate or stand-alone piece of equipment but be integrated into another device, such as in the case of a cable-ready television set.

FIG. 5 illustrates an exemplary embodiment of an LCD 208 according to the present invention. As shown in the simplified diagram of FIG. 5, the device 208 generally comprises an OpenCable-compliant embedded system (e.g., DSTB) having an RF front end 502 (including tuner and demodulator/decryptors) for interface with the HFC network 101 of FIG. 2a, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The LCD 208 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The LCD 208 of FIG. 5 is also provided with an OCAP-compliant application and Java-based middleware which, inter cilia, manages the operation of the device and applications running thereon. It will be recognized by those of ordinary skill that myriad different device and software architectures may be used consistent with the tuning and channel request functions of the present invention, the device of FIG. 5 being merely exemplary. For example, different middlewares (e.g., MHP, ARIB, or ACAP) may be used in place of the OCAP middleware of the illustrated embodiment.

The exemplary LCD 208 further comprises a personal content or media application, which allows a user to manage his personal content. Such management includes, but is not limited to, the ability to browse through content stored to see which are available for viewing, select content for local viewing, and configure various parameters associated with the remote access (e.g., user logon names, passwords, etc.). As previously described, the content available for viewing may be stored locally, or alternatively may be stored remotely, such as at the headend, BSA hub, or even a third party content source.

The personal content application is also responsive to a network-side application (e.g., server portion of a DA) that queries the LCD to check on the content titles stored on the LCD, and other data related thereto.

In one implementation, the client program resident on the LCD 208 tracks and reports user activity related to personal content viewing to the relevant server(s) for each LCD. This activity tracking is useful from a number of perspectives, including: (i) determining remote access to content that has been stored or viewed locally; (ii) in billing; and (iii) in determining when programs are added or deleted from the local storage (e.g., subscriber's DVR). This tracking can also be performed in a substantially anonymous fashion, such as through use of cryptographic hashes of TUNER ID, MAC, and similar variables as described in detail elsewhere herein. Such mechanisms allow for specific identification of the LCD 208 which has recorded or accessed content, without necessarily having to know the subscriber's identity.

Furthermore, an application on the LCD 208 can be made to be responsive to the user's commands to control the DVR from the remote or visited network 204. Such a logical connection from the remote network to the LCD can be implemented using any number of different approaches, including direct communications between the LCD 208 and the RCD 214 (e.g., via Internet), relayed communications that pass through the MSO (local) infrastructure (e.g., RCD 214 to CM 238 to LCD 208), and so forth. Allowing the subscriber to set up such a connection provides a remote management interface to managing the LCD to perform personal media related functions, among others, thereby adding significant flexibility to the operation and utilization of the remote content access functionality.

FIG. 6 illustrates an alternative embodiment of the LCD comprising a converged device (CD), such as that described in co-owned and co-pending U.S. patent application Ser. No. 11/378,129 entitled "Methods and Apparatus for Centralized Content and Data Delivery" filed Mar. 16, 2006, and incorporated herein by reference in its entirety. The exemplary CD 602 comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or WiFi architectures may also be provided via the device; these services can make use of the network operator's indigenous VoIP or comparable telephony capability if desired, thereby providing an even more unified service environment.

The converged premises device can also provide a trusted domain for content or data, as well as allowing a subscriber total mobility in the home by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This allows existing devices and DVRs to connect and share content with the CD, and also allows the network operator (e.g., MSO) to control and manage the premises coaxial network.

The CD is also advantageously accessible via any remote device with internetworking (e.g., Internet) capability, thereby allowing personal content to be accessed by the user (or other entities such as the content manager 238) from outside the premises.

Business Methods and Considerations—

Various exemplary business-related aspects of the remote content delivery technology previously discussed herein are described in detail.

In one embodiment, remote access capability is provided as an incentive or feature as part of the subscriber's subscription plan. Hence, this approach treats the remote location as merely an extension of the subscriber's premises, thereby requiring no differentiation between the remote and local domains.

In a second embodiment, streamed content or data sent to a RCD (e.g., cellular telephone, PDA, laptop, etc.) is differentiated (from a billing perspective) from that delivered to the subscriber's premises, and billed directly to the subscriber's MSO account, such as via their monthly cable TV bill. The billing module 152 or other comparable process software at the MSO headend is configured to obtain the relevant data regarding the subscriber's remote device usage, which is then integrated with that subscriber's other activity to generate a monthly statement. Such data may comprise, for example, the number of movies or other content the subscriber has downloaded during the past billing cycle. As an alternative to the foregoing "per-use" model, the subscriber may be offered a plan wherein they can obtain an unlimited (or finite) number of remote downloads or access per billing cycle, such as for a flat fee. As yet another alternative, the selected/downloaded content or data can be billed on a "pay as you go" basis, such as via debit card, electronic payment service (e.g., "Paypal™") or the like, with successful negotiation of the payment contract being a condition precedent to delivery of the content/data.

Content as discussed previously also need not be full length features (e.g., movies); rather, music videos, promotional materials, tutorials, trailers, and other desirable content can be provided in a broadcast or session fashion without the extra effort associated with entering into a contract with a separate service provider. Similarly, it is anticipated that content developers (such as the MSO themselves, or a third-party entity such as a studio or channel) will develop content specifically adapted to the remote delivery paradigm set forth herein; e.g., suitable to perhaps more limited bandwidth availability of the remote network 204. In this fashion, the MSO or other content source may also maintain two or more versions of the content recorded or purchased by the subscriber; e.g., a "local" or home copy, and a "remote" or lower bandwidth or differently encoded/compressed copy, with the applicable version being delivered to the user depending on their location. The local copy might also comprise HD, while the remote copy comprises an SD rendition of the same content.

This process can also work in reverse; i.e., to provide content or data from the subscriber upstream. As previously discussed, the captured video can be uploaded to the MSO or third party server, for later download and viewing at the subscriber's premises (or those of other subscribers authorized to view the content). Such download may also be to a second appropriately equipped RCD 214.

Figure 7:
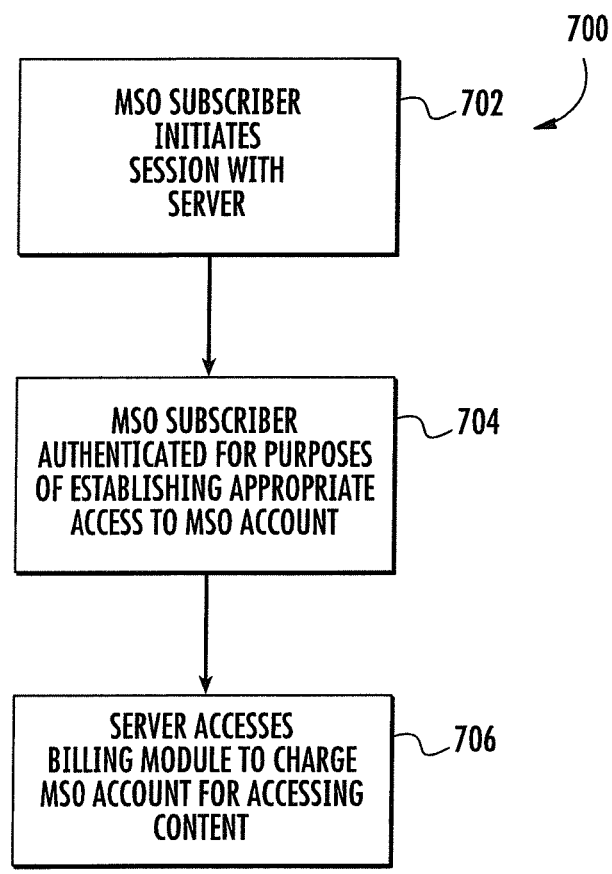
FIG. 7 is a logical flow diagram illustrating one exemplary business method for establishing common billing between a MSO subscriber's local network and remote access to content through a (mobile) client device.

Referring now to FIG. 7, one embodiment of the aforementioned methodology is described in detail in the context of an exemplary MSO and associated mobile device (RCD) user, although it will be appreciated that the methodology 700 is readily adapted to other contexts.

In step 702, an MSO subscriber wishing to access content initiates a session directly or indirectly with the network entity providing the content (e.g., content server 242).

Per step 704, the subscriber is authenticated for purposes of verifying that the subscriber attempting to access content through an MSO account is indeed the person named in the MSO account. This can be accomplished through a variety of means including via security architecture at the cable (MSO) side of the system architecture, and/or authentication via the CSP/WSP, or any other portion on the IP network side of the system.

Per step 706, the content server 242 can access the billing module 152 or other billing entity within the network, whether directly or indirectly, and write a record or data into the appropriate database so that the subscriber can be charged for the content on his/her home cable bill. Other relevant information such as date/time, content requested, CSP/WSP network identification, and so forth may be included in the billing information if desired in order to be included on the subscriber invoice.

Lastly, the billing module 152 or other entity responsible for generating billing data assembles the invoice or statement for the subscriber using the cable system component (e.g., monthly service/use charges) as well as those associated with content access and download via the CSP/WSP if any. These latter charges can be set off in a separate section of the statement if desired, or merely integrated into existing categories of services or charges.

Furthermore, where a business relationship exists between the CSP/WSP and the MSO, the subscribers wireless or mobile access charges during the billing period (whether related to content access or not) may also be incorporated into the subscriber's MSO-generated bill. In this fashion, the subscriber can be provided only one "umbrella" invoice covering both their cable/satellite and wireless charges. Various of the foregoing data may also be optionally bundled with VoIP or similar access charges, such as for example where the MSO offers VoIP telephony service to their subscribers via their indigenous cable/satellite and IP infrastructure. This allows for an even higher level of service integration, with the subscriber receiving only one bill for their "home" (e.g., VoIP-based) and wireless telephony, as well as their cable or satellite and Internet access. In one exemplary configuration, the MSO can offer 1) cable access (including premium services such as DVR/PVR and on-demand), 2) high speed Internet access (such as the "Roadrunner®" offered by the Assignee hereof), 3) VoIP-based telephone service, and 4) remote content delivery service.

It will also be appreciated that there are significant economies of scale to this approach for the service provider(s), such as by obviating the need for the printing and mailing or electronic processing of multiple separate monthly invoices, and reduced customer service overhead. Such integrated service packages also offer increased opportunities for promotions, incentives, and "cross-over" sales of products and services, thereby increasing the profitability of this paradigm.

Delivery of the content to remote client or mobile devices (or the user's PC or laptop) can also be effected according to the methods and apparatus described in co-pending and co-owned U.S. patent application Ser. No. 11/198,620 entitled "Method And Apparatus For Context-Specific Content Delivery" filed Aug. 4, 2005, incorporated herein by reference in its entirety, which describes, inter alia, the display and seamless transition of primary and secondary content within, e.g., a unified display mechanism (window). This integration allows for yet additional business or economic opportunities, since the content downloaded by the user can be coupled (seamlessly) to an advertising server or the like, the latter presenting the user with context-specific links or other information (secondary content) relating to the primary content (e.g., video) downloaded. The user then merely selects one or more of these links, and is provided additional information relating to the topic of interest (either the primary content or the links which individually may or may not be commercial in nature). These links can be accessed, e.g., a traditional IP or similar mechanism of the type previously described herein, such as the well known WAP protocol and browser.

In addition to the foregoing, the "watch-along" function can also be marketed as an incentive or additional premium feature. Specifically, parents or others may desire to have the capability to both monitor what their children are watching while they are away, as well as affirmatively control access to certain channels or content from a remote location. This paradigm can also be readily extended into the enterprise or business arenas, such as to monitor/control employee channel usage.

In addition to the foregoing, business models related to the provision of remote reservation data caching are envisaged using the present invention. For example, in one such method, the subscriber is offered remote reservation capability (and the various features previously described with respect to FIG. 3a herein) as part of a premium service package, or as an incentive. Moreover, the subscriber may be given other incentives or even consideration (e.g., reduction of their monthly bill) where they permit remote caching (and use of the cached data by the MSO), since this provides benefits to the MSO in terms of inter alia bandwidth allocation and prediction based on reservations made.

In another variant, the "remote parental masking" capability previously described (i.e., the ability for a remote parent to view an even prohibit or mask certain types of content for reservation by their children, etc.) is offered for a premium, or as part of an incentive package.

Similarly, various business models relating to the provisional of "virtual" control functions or emulations are contemplated. In one such model, the subscriber pays a premium for the ability to emulate its premises equipment, or alternatively this comprises a premium subscription or incentive feature. The subscriber may also pay for the updates to emulation features, such as when they obtain a new RCD (e.g., laptop), or new CPE (e.g., a DVR or DSTB).

Operations/Business Rules Engine—

In another aspect of the invention, the aforementioned content manager 238 (e.g., rendered as one or more computer programs) includes a so-called "rules" engine. This engine comprises, in an exemplary embodiment, a series of software routines running on the content server device 242 or other associated hardware/firmware environment adapted to control the operation of the content management algorithms previously described. These rules may also be fully integrated within the content manager 238 itself, and controlled via e.g., a GUI on a PC connected to the server 242. In effect, the rules engine comprises a supervisory entity which monitors and selectively controls, via the content manager 238, the remote content delivery functions at a higher level, so as to implement desired operational or business rules. The rules engine can be considered an overlay of sorts to the remote content management and delivery algorithms. For example, the content manager 238 may invoke certain operational protocols or decision processes based on requests received from the RCD, subscriber data, geographic data, etc. However, these processes may not always be compatible with higher level business or operational goals, such as maximizing profit or system reliability. Hence, when imposed, the business/operational rules can be used to dynamically (or manually) control the operation of the CM 238. The rules may be, e.g., operational or business-oriented in nature, or related to preservation of security, and may also be applied selectively in terms of time of day, duration, specific local areas, or even at the individual user level.

For example, one rule implemented by the rules engine may comprise only providing targeted secondary content insertion (e.g., advertising) to certain classes of subscribers (e.g., those at a premium level of service, or subscribers who have "opted-in" to receiving targeted advertising, since these subscribers may be considered to have the highest revenue potential or likelihood of responding to the targeted advertisement).

Another rule might impose a moratorium on delivering certain content (even if already viewed or recorded by the subscriber at the LCD 208) over the remote network to the RCD due to an actual or perceived threat of theft or unauthorized copying. For example, the MSO may only allow remote delivery of certain classes of content that are not considered "high value", or are sufficiently dated since their release over the local network.

It will also be appreciated that certain subscribers may be given preference for remote delivery of content over others, such as in cases where the remote network bandwidth is limited.

It will be appreciated that less "binary" approaches than that described above can be utilized consistent with the invention, whether in the context of secondary content insertion, servicing remote delivery requests, or otherwise. Specifically, the foregoing approaches to remote delivery of content based on prior recording or tuner state has effectively two states; i.e., delivered or not delivered. This model has the advantage of simplicity, in that little real intelligence is required for implementation. For example, a supervisory process (e.g., algorithm) may comprise a fuzzy logic, Bayesian, or similar approach to classify individual RCDs into one of two categories in terms of a particular context (e.g., "high-value" or "low-value", "local" or "distant", "low bandwidth" or "high bandwidth", etc.), which can then be used as the sole (or at least partial) basis for delivering content for the designated RCD.

Many other approaches and combinations are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A personal content distribution system, said system comprising:
 a first network configured to distribute a plurality of content to a first device at a first location;
 a personal content server in operative communication with said first network; and
 a second network in data communication with said personal content server and configured to receive and service requests to access particular ones of said plurality of content from a second device at a second location remote from said first location;
 wherein said personal content server is further configured to receive reservation data from at least said first device, said reservation data comprising information related to one or more particular ones of said plurality of content and a future time at which said one or more particular ones of said plurality of content are designated to be viewed, and utilize said reservation data to cause delivery of said one or more particular ones of said plurality of content to at least said second device at said future time.

2. The system of claim 1, wherein said first device and said second device are both associated with a common user or account, said association being determined at least in part from information received from said second device, said information comprising authentication information related to said common user or account.

3. The system of claim 2, wherein said first network comprises a cable or satellite network having a plurality of subscribers, and said common user or account comprises one of said plurality of subscribers.

4. The system of claim 1, wherein said first device and said second device have at least one relationship, said at least one relationship comprising said first device having said particular content disposed thereon in either substantially permanent or ephemeral storage.

5. The system of claim 1, wherein said first network comprises a cable or satellite network, said second network comprises a mobile wireless network configured to distribute content to a plurality of mobile users, and said second device comprises a mobile device.

6. The system of claim 5, wherein said mobile wireless network comprises a Wi-Fi (IEEE-Std. 802.11) compliant network, and said mobile device comprises a handheld computer.

7. The system of claim 5, wherein said mobile wireless network comprises a cellular network, and said mobile device comprises a smartphone.

8. The system of claim 5, wherein said first device and said second device are associated with a common user or account that is subscribed to receive first service over said cable or satellite network, and second service over said wireless network.

9. The system of claim 1, wherein said personal content server is operative to dynamically select at least one of the following for delivery of said one or more particular ones of said plurality of content to said second device: (i) encoding/decoding format; (ii) conditional access format; and/or (iii) a network interface over which said one or more particular ones of said plurality of content is delivered to said second device.

10. The system of claim 1, wherein at least one of said first network or said second network comprises at least one apparatus configured to mitigate spoofing of said personal content server by an unauthorized device or user.

11. The system of claim 1, wherein said second device is configured to move to a plurality of different locations within said second network, and said personal content server is configured to authenticate said second device at each of said plurality of different locations.

12. The system of claim 1, further comprising a third network in communication with said first network, said second device configured to move between said second and third networks, and said personal content server configured to authenticate said second device at each of said second and third networks.

13. The system of claim 1, wherein said personal content server comprises a first portion of a distributed software application, and said second device comprises a second portion of said distributed software application, said first and second portions of said distributed software application configured to communicate with one another over at least said second network in order to provide said delivery of said one or more particular ones of said plurality of content.

14. The system of claim 1, wherein said reservation data comprises identification information related to a program or service.

15. The system of claim 1, wherein said reservation data is user-specific.

16. A method for managing a personal content distribution network, said method comprising:
receiving reservation data from a first device, said reservation data comprising information related to one or more particular ones of a plurality of content and a future time at which said one or more particular ones of said plurality of content are designated to be delivered;
distributing first ones of said plurality of content to said first device at a first location over a first network portion based at least in part on said reservation data;
receiving a request to access second content, said request originating from a second device at a second location remote from said first location; and
when it is determined that said second content was among first ones of said plurality of content distributed to said first device and said request to access said second content is received subsequent to said future time enabling distribution of said second content to said second device.

17. The method of claim 16, wherein said determination comprises: querying a listing of prior activity of said first device for said second content.

18. The method of claim 16, wherein further comprising determining whether said content has been purchased using a subscription account associated with a user of said first device.

19. The method of claim 16, wherein said first network comprises an Internet, and said second network comprises a managed content distribution network, and said method further comprises allowing reservation data to be sent over said Internet to a storage location associated with a content server disposed at a node of said managed content distribution network.

20. The method of claim 16, wherein said first device comprises a content recording device, and said determination further comprises determining whether said content has been recorded via said recording device.

21. A personal content distribution apparatus, said apparatus comprising:
a processor;
at least one network interface; and
a storage device in data communication with said processor, said storage device comprising at least one computer program, said computer program comprising a plurality of instructions which are configured to, when executed by said processor, cause said personal content apparatus to:
receive reservation data from a first client device, said reservation data comprising information related to one or more particular ones of a plurality of content and a future time at which said one or more particular ones of said plurality of content are designated to be delivered;
cause said one or more particular ones of said plurality of content to be recorded at said storage device;
receive a second request to access second content, said second request originating from a second client device at a second location remote from said first client device at a first location; and
when it is determined that said requested second content was among said plurality of content recorded and said request to access is received subsequent to said future time, distribute said second content to said second client device.

22. The apparatus of claim 21, wherein said determination of whether said second device is authorized to receive said second content comprises said plurality of instructions being further configured to cause said personal content distribution apparatus to query said stored device to determine whether said second content is among said one or more particular ones of said plurality of content recorded.

23. The apparatus of claim 22, wherein said plurality of instructions are further configured to cause said personal content distribution apparatus to in response to said delivery of said second content to said second client device, disable delivery of said second content to said first client device during a time period corresponding to a play-back time of said second content at said second client device.

24. The apparatus of claim 21, wherein said first client device and said second client device are both associated with a common user or account, said association being determined at least in part from information received from said second client device, said information comprising authentication information related to said common user or account.

25. The apparatus of claim 21, wherein said plurality of instructions are further configured to dynamically select at least one of the following for delivery of said one or more particular ones of said plurality of content to said first client device: (i) encode/decode format; (ii) conditional access format; and/or (iii) said at least one network interface over which said one or more particular ones of said plurality of content is delivered to said first client device.

* * * * *